(12) United States Patent
Bhaskar et al.

(10) Patent No.: US 11,233,452 B2
(45) Date of Patent: Jan. 25, 2022

(54) MICROGRID POWER SUPPLY SYSTEM DC-DC CONVERTER AND CONTROLLING METHOD

(71) Applicant: Prince Sultan University, Riyadh (SA)

(72) Inventors: Mahajan Sagar Bhaskar, Riyadh (SA); Dhafer J. Almakhles, Riyadh (SA); Umashankar Subramaniam, Riyadh (SA); Sanjeevikumar Padmanaban, Riyadh (SA); Sakthivel Rathinasamy, Coimbatore (IN)

(73) Assignee: Prince Sultan University, Riyadh (SA)

( * ) Notice: Subject to any disclaimer, the term of this patent is extended or adjusted under 35 U.S.C. 154(b) by 0 days.

(21) Appl. No.: 16/798,532

(22) Filed: Feb. 24, 2020

(65) Prior Publication Data

US 2021/0265919 A1    Aug. 26, 2021

(51) Int. Cl.
| | |
|---|---|
| *H02M 3/158* | (2006.01) |
| *H02M 3/07* | (2006.01) |
| *H02J 1/00* | (2006.01) |
| *H02J 5/00* | (2016.01) |
| *H02M 1/00* | (2006.01) |

(52) U.S. Cl.
CPC .............. *H02M 3/158* (2013.01); *H02M 3/07* (2013.01); *H02J 1/00* (2013.01); *H02J 5/00* (2013.01); *H02M 1/0095* (2021.05)

(58) Field of Classification Search
CPC .......... H02J 1/00; H02M 1/00; H02M 1/0095; H02M 3/01; H02M 3/015; H02M 3/07–078; H02M 3/155–1588
See application file for complete search history.

(56) References Cited

U.S. PATENT DOCUMENTS

| | | | | |
|---|---|---|---|---|
| 5,146,395 A | * | 9/1992 | McKie | H02M 3/07 363/13 |
| 5,313,382 A | * | 5/1994 | Farrington | H02M 3/158 363/16 |
| 9,917,517 B1 | * | 3/2018 | Jiang | H02M 3/07 |

(Continued)

OTHER PUBLICATIONS

Jeeson Cheriyan, et al., "A Closed loop high gain DC-DC converter for electric drive applications", 2018 International Conference on Control, Power, Communication and Computing Technologies (ICCPCCT), 2018, pp. 40-44.

(Continued)

*Primary Examiner* — Fred E Finch, III
(74) *Attorney, Agent, or Firm* — Oblon, McClelland, Maier & Neustadt, L.L.P.

(57) ABSTRACT

A DC-DC voltage converter includes an input circuit, a parallel linked leg (PLL), an output circuit and a controller. The PLL includes an active leg switch, a leg inductor, a leg capacitor and a leg diode. The controller is configured to i) turn on the active input switch and the active leg switches while maintaining the active output switch at a turn off state for the first duty cycle period ii) turn off the active input switch and the active leg switches, and turn on the active output switch for a second duty cycle period following the first duty cycle period, and iii) turn off the active output switch while maintaining also turn off states of the active input switch and the active leg switches for a remaining period following the second duty cycle period. A method of controlling the DC-DC converter includes steps of i) to iii).

19 Claims, 26 Drawing Sheets

(56) References Cited

U.S. PATENT DOCUMENTS

| | | | | |
|---|---|---|---|---|
| 9,933,805 | B2* | 4/2018 | Liu | H02M 3/156 |
| 10,277,124 | B2* | 4/2019 | Guan | H02M 3/156 |
| 2013/0163302 | A1* | 6/2013 | Li | H02M 3/07 363/127 |
| 2014/0098573 | A1* | 4/2014 | Pan | H02M 3/335 363/16 |
| 2016/0064160 | A1* | 3/2016 | Lemmen | H02M 3/158 363/123 |
| 2017/0054364 | A1* | 2/2017 | Ferdowsi | H02M 3/158 |
| 2019/0386566 | A1* | 12/2019 | Zhang | H02M 1/15 |

OTHER PUBLICATIONS

Soumya Manoharan, et al., "Closed Loop Control of Non-lsolated Bidirectional DC/DC Converter", IOSR Journal of Engineering (IOSRJEN), vol. 3, Issue 6, Jun. 2013, pp. 37-43.

Rosemary Mathai, et al., "DC-DC Converter With Reduced Stress Using Switched Inductor Technique With Feedback Control", International Journal of Advanced Research in Electrical, Electronics and Instrumentation Engineering, vol. 3, Special Issue 5, Dec. 2014, pp. 368-373.

Mahajan Sagar Bhaskar, et al., "High Gain Transformer-Less Double-Duty-Triple-Mode DC/DC Converter for DC Microgrid", IEEE Access, vol. 7, Mar. 1, 2019, pp. 36353-36370.

Lung-Sheng Yang, et al., "Transformerless DC-DC Converters With High Step-Up Voltage Gain", IEEE Transactions on Industrial Electronics, vol. 56, No. 8, Aug. 2009, pp. 3144-3152.

M. Lakshmi, et al., "Nonisolated High Gain DC-DC Converters for DC Microgrids", IEEE Transactions on Industrial Electronics, vol. 65, No. 2, Feb. 2018, pp. 1205-1212.

Hamed Mashinchi MAHERI, et al., "High Step-Up DC-DC Converter With Minimum Output Voltage Ripple", IEEE Transactions on Industrial Electronics, vol. 64, No. 5, May 2017, pp. 3568-3575.

Oday Ahmed, "Investigation Into High Efficiency DC-DC Converter Topologies For A DC Microgrid System", Electrical Power and Power Electronics Group, Department of Engineering, Dec. 2011, pp. 1-315.

\* cited by examiner

MICROGRID POWER SUPPLY SYSTEM DC-DC CONVERTER AND CONTROLLING METHOD

STATEMENT OF PRIOR DISCLOSURES BY THE INVENTOR(S)

Aspects of the present disclosure were described in a publication by the inventor(s) in "High Gain Transformer-Less Double-Duty-Triple-Mode DC/DC Converter for DC Microgrid," IEEE Access, Vol. 7, 2019 (Digital Object Identifier 10.1109/ACCESS.2019.2902440) having a publication date of Mar. 1, 2019 and which is incorporated by reference in its entirety.

BACKGROUND

Technical Field

The present disclosure is directed to microgrid system with DC load and DC-DC converter for microgrid applications.

Description of the Related Art

Recently, microgrid power supply systems with high voltage DC output, particularly DC-DC power converters for the microgrid power supply systems have been gaining increasing attraction, due to rapid development in renewable energy sources and power electronics technologies, as described in L. Meng, Q. Shafiee, G. Ferrari Trecate, H. Karimi, D. Fulwani, X. Lu, J. Guerrero, "Review on Control of DC Microgrids," IEEE J. Emerg. Sel. Topics Power Electron., pp. 1-1, 2017, and M.-H. Wang, S.-C. Tan, C.-K. Lee, and S. Y. Hui, "A Configuration of Storage System for DC Microgrids," IEEE Trans. Power Electron., vol. 33, no. 5, pp. 3722-3733, May 2018, the entire contents of both are incorporated herein by reference.

In microgrid applications, DC-DC converters with high voltage conversion capability and high efficiency are preferred due to low terminal voltages associated with renewable energy sources, for example, fuel-cell and photovoltaic cell (PV cell), as described in A. M. S. S. Andrade, L. Schuch, and M. L. da Silva Martins, "High Step-Up PV Module Integrated Converter for PV Energy Harvest in FREEDM Systems," IEEE Trans. on Ind. Appl., vol. 53, no. 2, pp. 1138-1148, March 2017, and A. Chub, D. Vinnikov, E. Liivik, and T. Jalakas, "Multiphase Quasi-Z-Source DC-DC Converters for Residential Distributed Generation Systems," IEEE Trans. Ind. Electron., vol. 65, no. 10, pp. 8361-8371, October 2018, the entire contents of both are incorporated herein by reference.

FIG. 1 illustrates a schematic block diagram of a typical microgrid system with a DC-DC converter. The DC-DC converter 102 lifts up low DC voltages (12-48V) generated by renewable energy sources 101 to competent DC voltage levels (200-400V) for DC loads 103, a DC-AC inverter 104 further converts to competent AC voltages for a utility grid or AC loads 105. Unfortunately, a conventional boost converter is not a desirable solution to achieve a high step-up voltage gain due to electromagnet interference (EMI), Effective Series Resistance (ESR) of inductor, high ratings required for reactive components and semiconductor devices. In addition, the converter suffers diode reverse recovery problems when the conventional boost converter runs at a high duty cycle to obtain high voltage, as described in Y. P. Hsieh, J. F. Chen, T. J. Liang, L. S. Yang, "A Novel High Step-Up DC-DC Converter for a Microgrid System," IEEE Trans. Power Electron., vol. 26, no. 4, pp. 1127-1136, April 2011., and R. Gules, W. Santos, F. Reis, E. Romaneli, A. Badin, "A Modified SEPIC Converter With High Static Gain for Renewable Applications," IEEE Trans. Power Electron., vol. 29, no. 11, pp. 5860-5871, November 2014, the entire contents of both are incorporated herein by reference.

To mitigate these issues, varieties of DC-DC converters have been presented with high efficiency, high gain, and small volume etc. See for example, H. Liu, F. Li, P. Wheeler, "A Family of DC-DC Converters Deduced From Impedance Source DC-DC Converters for High Step-Up Conversion," IEEE Trans. Ind. Electron., vol. 63, no. 11, pp. 6856-6866, November 2016, and M. Forouzesh, Y. P. Siwakoti, S. A. Gorji, F. Blaabjerg, and B. Lehman, "Step-Up DC-DC Converters: A Comprehensive Review of Voltage-Boosting Techniques, Topologies, and Applications," IEEE Trans. Power Electron., vol. 32, no. 12, pp. 9143-9178, December 2017.

Isolated DC-DC converters like half and full bridge, forward converters, push-pull converters, and flyback converters have been proposed and have realized higher voltage gain by using transformers as described in M. Kim and S. Choi, "A Fully Soft-Switched Single Switch Isolated DC-DC Converter," IEEE Trans. Power Electron., vol. 30, no. 9, pp. 4883-4890, September 2015, and Z. Zhang, O. Thomsen, M. Andersen, "Soft-Switched Dual-Input DC-DC Converter Combining a Boost-Half-Bridge Cell and a Voltage-Fed Full-Bridge Cell," IEEE Trans. Power Electron., vol. 28, no. 11, pp. 4897-4902, November 2013. Nevertheless, those configurations suffered from high spikes in voltage, high power dissipations across the switches due to leakage inductance of the transformer and also from core saturation effect of the transformer. Additional active clamping techniques and snubber circuits have been proposed to extenuate those issues, where however, the additional control switches and drivers required inevitably increase the cost of the circuits. See for example, G. Spiazzi, P. Mattavelli, and A. Costabeber, "High Step-Up Ratio Flyback Converter With Active Clamp and Voltage Multiplier," IEEE Trans. Power Electron., vol. 26, no. 11, pp. 3205-3214, November 2011, and G. Tibola, E. Lemmen, J. L. Duarte, and I. Barbi, "Passive Regenerative and Dissipative Snubber Cells for Isolated SEPIC Converters: Analysis, Design, and Comparison," IEEE Trans. Power Electron., vol. 32, no. 12, pp. 9210-9222, December 2017.

An interleaved converter technique with parallel connections between several converters has been proposed to reduce input ripples, input filter size, and to achieve high gain and high efficiency as described in J. Ebrahimi, S. H. Hosseini, E. Babaei, T. Nouri, "Interleaved high step-up DC-DC converter based on three-winding high frequency coupled inductor and voltage multiplier cell," IET Power Electronics, vol. 8, no. 2, pp. 175-189, February 2015. However, due to parallel connections of several converters, complexity of drive circuitry and of switching control logic, higher loss of energy and lower efficiency of the converter are caused.

Switched capacitor and switched inductor integration with classical converter, cascaded boost converters (CBC), quadratic boost converter (QBC) and voltage multiplier have been presented to realize high voltage gains. Nonetheless, switched capacitor and switched inductor stages, require a large number of capacitors and semiconductors thereby increasing the complexity and cost of the converter. High rating reactive components and semiconductor devices are required in cascaded and quadratic converters. Moreover, complex control is required for switches to improve stability, because voltage gain is highly non-linear with duty cycle. See for example, L. Liu, D. Li, and L. Yao, "*A family of non-isolated transformerless high step-up DC-DC converters,*" Int Trans Elect. Energy Syst, vol. 29, no. 4, p. e2794, April 2019, F. Tofoli, D. Pereira, W. Paula, D. Júnior, D. de C. Pereira, "*Survey on non-isolated high-voltage step-up dc-dc topologies based on the boost converter,*" IET Power Electronics, vol. 8, no. 10, pp. 2044-2057, October 2015, A. Iqbal, M. S. Bhaskar, M. Meraj, S. Padmanaban, R. Syed, "*Closed-Loop Control and Boundary for CCM and DCM of Non-Isolated Inverting Nx Multilevel Boost Converter for High Voltage Step-Up Applications,*" IEEE Trans. on Ind. Electron., pp. 1-1, 2019, A. Iqbal, M. S. Bhaskar, M. Meraj, S. Padmanaban, "*DC-Transformer Modelling, Analysis and Comparison of the Experimental Investigation of a Non-Inverting and Non-Isolated Nx Multilevel Boost Converter (Nx MBC) for Low to High DC Voltage Applications,*" IEEE Access, vol. 6, pp. 70935-70951, 2018, B. Axelrod, Y. Berkovich, and A. Ioinovici, "*Switched-Capacitor/Switched-Inductor Structures for Getting Transformerless Hybrid DC-DC PWM Converters,*" IEEE Trans. Circuits Syst. I, vol. 55, no. 2, pp. 687-696, March 2008, and E. H. Ismail, M. A. Al-Saffar, A. J. Sabzali, and A. A. Fardoun, "*A Family of Single-Switch PWM Converters With High Step-Up Conversion Ratio,*" IEEE Trans. Circuits Syst. I, vol. 55, no. 4, pp. 1159-1171, May 2008.

A non-isolated coupled-inductor-based converter has been proposed to realize a high voltage gain and a higher efficiency. High voltage, recovery of inductance leakage energy, reduced switch stress and high efficiency have been attained by adjusting the number of turns and corresponding coupling factors of coupled inductors. Nonetheless, due to coupled inductor leakage inductance, more time is required for diode reverse recovery. Further, complexity, the cost and size of the converter circuit increases due to utilization of the coupled inductor. See for example, M. Forouzesh, Y. Shen, K. Yari, Y. Siwakoti, F. Blaabjerg, "*High-Efficiency High Step-Up DC-DC Converter With Dual Coupled Inductors for Grid-Connected Photovoltaic Systems,*" IEEE Trans. Power Electron., vol. 33, no. 7, pp. 5967-5982, July 2018, and H. Ardi, A. Ajami, and M. Sabahi, "*A Novel High Step-Up DC-DC Converter With Continuous Input Current Integrating Coupled Inductor for Renewable Energy Applications,*" IEEE Trans. Ind. Electron., vol. 65, no. 2, pp. 1306-1315, February 2018.

A switched capacitor with n cell structure has been presented to increase voltage gain. However, the converter requires a large number of components, complex control, large size and high cost, and thus exhibits lower efficiency. See for example, Y. Tang, T. Wang, Y. He, "*A Switched-Capacitor-Based Active-Network Converter With High Voltage Gain,*" IEEE Trans. on Power Electron., vol. 29, no. 6, pp. 2959-2968, June 2014, and M. Bhaskar, S. Padmanaban, F. Blaabjerg, M. S. Bhaskar, S. Padmanaban, and F. Blaabjerg, "*A Multistage DC-DC Step-Up Self-Balanced and Magnetic Component-Free Converter for Photovoltaic Applications: Hardware Implementation,*" Energies, vol. 10, no. 5, p. 719, May 2017.

A voltage lift concept has been proposed for less cost, high power density, minimum control switches, simple structure, minimum ripple in output voltage and higher efficiency as described in F. Shahir, E. Babaei, M. Farsadi, "*Analysis and design of voltage-lift technique-based non-isolated boost dc-dc converter,*" IET Power Electron., vol. 11, no. 6, pp. 1083-1091, May 2018.

Charging two inductors in parallel and discharging in series in converters has been presented, where voltage gains achieved have been moderate in spite of need of additional capacitors and diodes as described in L. Yang, T. Liang, J. Chen, "*Transformerless DC-DC Converters With High Step-Up Voltage Gain,*" IEEE Trans. on Ind. Electron., vol. 56, no. 8, pp. 3144-3152, August 2009.

A non-isolated converter controlling the voltage gain by using two duty ratios has been proposed for microgrid application. High voltage gain without using voltage multiplier has been attained, although the voltage gain has been restricted in spite of employing three switches and two inductors. See for example, M. Lakshmi, S. Hemamalini, "*Nonisolated High Gain DC-DC Converter for DC Microgrids,*" IEEE Trans. on Ind. Electron., vol. 65, no. 2, pp. 1205-1212, February 2018.

Using multiple active-passive inductor cells has been proposed to achieve higher voltage gain. Replacing inductors by switched inductor has also been proposed. However, the use of several inductors and diodes results in increased cost and size of the converter, and restricts the output voltage in spite of using the multiple cells and switches. See for example, H. Maheri, E. Babaei, M. Sabahi, S. Hosseini, "*High Step-Up DC-DC Converter With Minimum Output Voltage Ripple,*" IEEE Trans. Ind. Electron., vol. 64, no. 5, pp. 3568-3575, May 2017, and E. Babaei, H. M. Maheri, M. Sabahi, S. H. Hosseini, "*Extendable Nonisolated High Gain DC-DC Converter Based on Active-Passive Inductor Cells,*" IEEE Trans. on Ind. Electron., vol. 65, no. 12, pp. 9478-9487, December 2018.

As described above, previous attempts have not successfully increased the output voltage gain of the DC-DC converter without sacrificing circuit cost and simplicity, and control logic of the converters. In the present disclosure, a new approach is presented for realizing a DC-DC converter with a remarkably high voltage gain with in a practical range of cost and simplicity of circuits and control logic.

SUMMARY

In an exemplary embodiment, a DC-DC voltage converter includes an input circuit, a parallel linked leg (PLL), an output circuit and a controller. The input circuit further includes a pair of input terminals, an input inductor, and an active input switch. A positive contact of the input inductor is connected to a higher voltage input terminal of the pair of input terminals. A positive port, a negative port and a gate port of the active input switch are each connected to a negative contact of the input inductor, a lower voltage input terminal of the pair of input terminals and a first output port of the controller, respectively. A higher voltage input terminal and a lower voltage input terminal of the pair of input terminals are each configured to be connected to a higher voltage terminal and a lower voltage terminal of a DC voltage source, respectively. The PLLj (j=1, . . . , n, n≥1), further includes an active leg switch $S_j$, a leg inductor $L_j$ connected in series with the active leg switch $S_j$ via a negative port of the active leg switch $S_j$ and a positive contact of the leg inductor $L_j$ and a leg capacitor $C_j$, and a leg diode $D_j$ connected in series with the leg capacitor $C_j$ via a negative contact of the leg capacitor $C_j$ and a positive port of the leg diode $D_j$. Further, a combination of the leg capacitor $C_j$ and the leg diode $D_j$ connected in series is connected in parallel with the leg inductor $L_j$, where the positive contact of the leg capacitor $C_j$ is connected to the positive contact of the leg inductor $L_j$. A positive port and a gate port of the active leg switch $S_j$ are connected to the higher voltage input terminal and the first output port of the controller, respectively, and the negative contact of the leg inductor $L_j$ constituting the $PLL_j$ is connected to i) the lower voltage input port when j=1, or ii) a negative contact of a leg capacitor $C_{j-1}$ of a $PLL_{j-i}$ when j≥2. The output circuit includes an active output switch, a combination of an output diode and an output capacitor, and a pair of output terminals, where a positive port and a negative port of the output diode are each connected to the negative contact of the input inductor and a positive contact of the output capacitor, respectively, a negative contact of the output capacitor is connected to a negative contact of a leg capacitor $C_n$ of a $PLL_n$. A positive port of the active output switch is connected to either one of a) the positive port of the output diode, or b) a negative port of an output switch diode, wherein a positive port of the output switch diode is connected to the positive port of the output diode, a negative port and a gate port of the active output switch are each connected to a positive contact of the leg capacitor $C_n$ of the $PLL_n$ and a second output port of the controller, respectively. The pair of output terminals are each configured to be connected to an external load.

The controller is configured to i) turn on the active input switch and the active leg switches and maintain turn on states of them while maintaining the active output switch at a turn off state for the first duty cycle period $k_1T$, where $k_1$ is first duty ratio and T denotes a period for a complete switching cycle, ii) turn off the active input switch and the active leg switches, maintain turn off states of them, and turn on the active output switch and maintain a turn on state for a second duty cycle period $k_2T$, following the first duty cycle period, where $k_2$ is second duty ratio and $k_1+k_2<1$, and iii) turn off the active output switch and maintain the turn off state while maintaining also turn off states of the active input switch and the active leg switches for a remaining period $(1-k_1-k_2)T$ following the second duty cycle period.

In another exemplary embodiment, a method of controlling a DC-DC converter, the DC-DC converter includes an input circuit which further includes an input inductor and an active input switch connected in series, a parallel linked leg (PLL) which further includes an active leg switch, a leg inductor, a leg capacitor, and a leg diode, an output circuit which further includes an active output switch, an output diode and an output capacitor, and a controller, where the method includes turning on the active input switch and the active leg switches and maintaining turn on states of them while maintaining the active output switch at a turn off state for a first duty cycle period $k_1T$, turning off the active input switch and the active leg switches and maintaining turn off states of them and turning on the active output switch and maintaining a turn on state for a second duty cycle period $k_2T$ following the first duty cycle period, where $k_2$ is second duty ratio and turning off the active output switch and maintaining the turn off state while maintaining also turn off states of the active input switch and the active leg switches for a remaining time span $(1-k_1-k_2)T$ following the second duty cycle period.

In another exemplary embodiment, a microgrid power supply system includes a DC power source and a DC-DC converter, where the DC-DC converter further includes an input circuit which further includes an input inductor and an active input switch connected in series, a parallel linked leg (PLL) which further includes an active leg switch, a leg inductor, a leg capacitor, and a leg diode, an output circuit which further includes an active output switch, an output diode and an output capacitor, and a controller, where the controller is configured to i) turn on the active input switch and the active leg switches and maintain turn on states of them while maintaining the active output switch at a turn off state for the first duty cycle period $k_1T$, where $k_1$ is first duty ratio and T denotes a period for a complete switching cycle, ii) turn off the active input switch and the active leg switches, maintain turn off states of them, and turn on the active output switch and maintain a turn on state for a second duty cycle period $k_2T$ following the first duty cycle period, where $k_2$ is second duty ratio and iii) turn off the active output switch and maintain the turn off state while maintaining also turn off states of the active input switch and the active leg switches for a remaining period following the second duty cycle period.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 12F illustrates observed waveforms of voltages across the active input switch S and the active leg switch $S_1$, and a voltage $V_{AB}$ between the terminals A and B, and the current $i_L$ through the input inductor L.

FIG. 13E illustrates observed waveforms of voltages across the active input switch S and the active leg switches $S_1$, $S_2$ and a voltage $V_{AB}$ between the terminals A and B.

DETAILED DESCRIPTION

Figure 1:
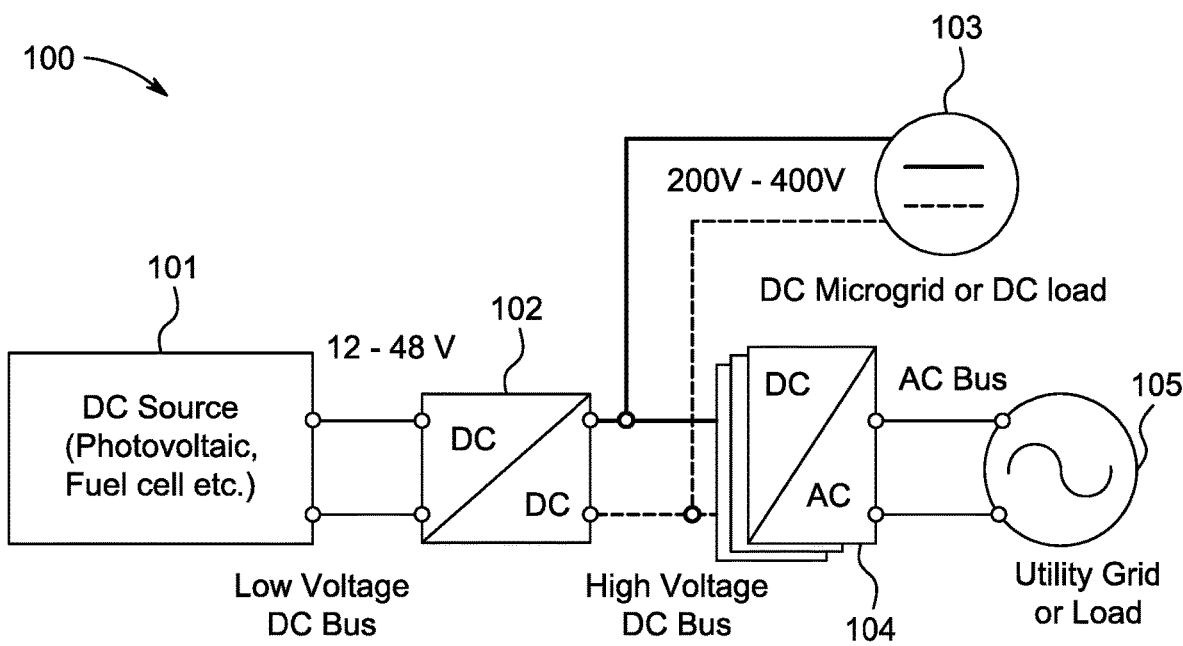
FIG. 1 is a schematic block diagram of a typical microgrid system with a DC-DC converter; according to known technologies and according to certain embodiments of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to a microgrid system with a DC-DC converter, configurations of the DC-DC converters for microgrid systems and methods for controlling the same. In some implementations, a microgrid system including a DC-DC converter, where the DC-DC converter includes an input circuit, a parallel linked leg(s) (PLL), an output circuit and a controller can realize a high voltage gain within a practical range of cost, circuit simplicity and control logic simplicity, where the controller is configured to adjust a switching frequency and/or duty ratios of switches in the input circuit, the PLL and the output circuit.

Figure 2:
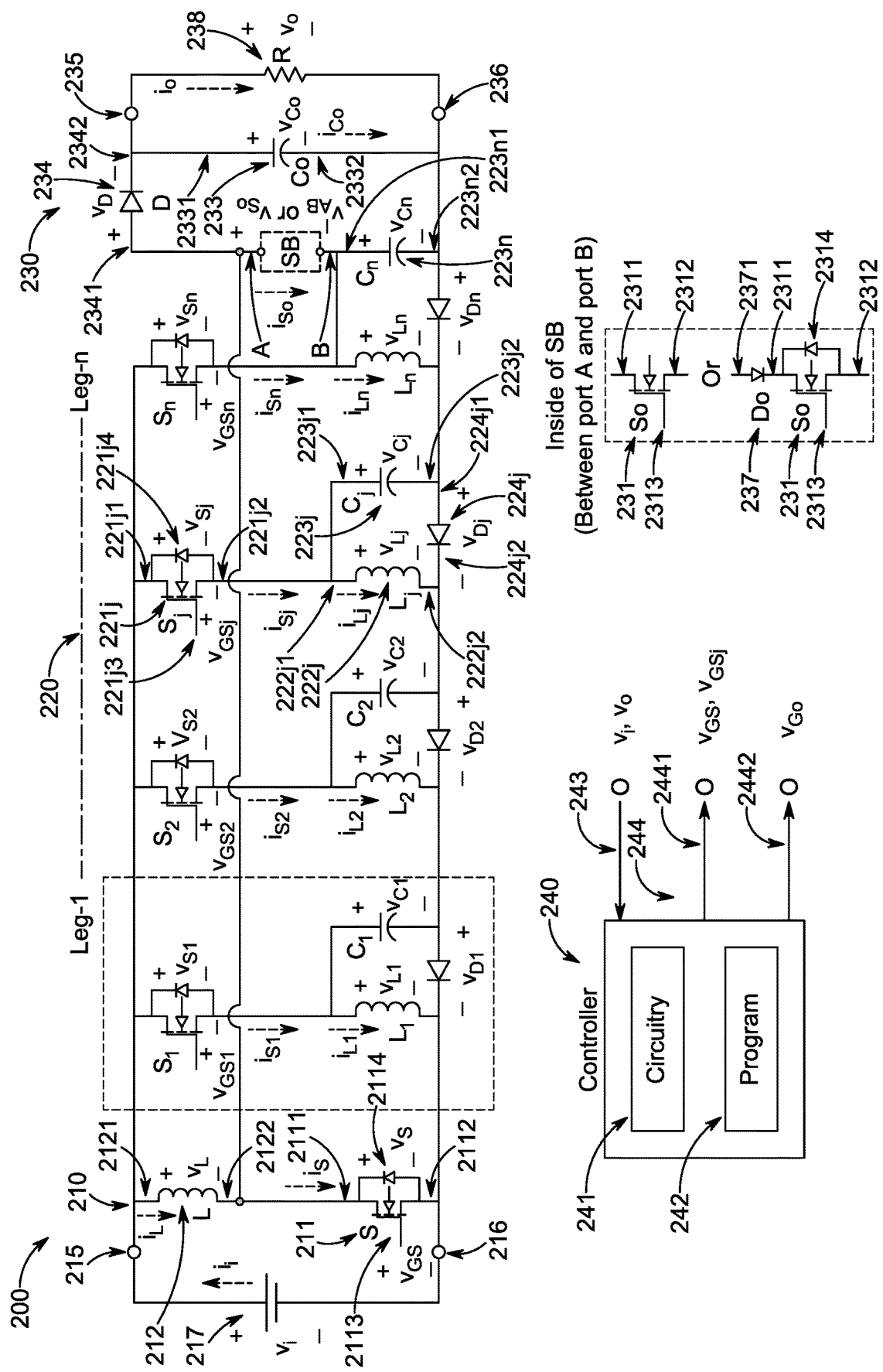
FIG. 2 is an exemplary circuit diagram of PLL-HG converter according to certain embodiments of the present disclosure.

FIG. 2 is an exemplary power circuitry of parallel linked leg high gain (PLL-HG) converter according to certain embodiments. The power circuitry of the PLL-HG converter is obtained by employing n (n≥1) parallel leg(s) in the middle section of the classical boost converter. The PLL-HG converter 200 includes an input circuit 210, a PLL 220, an output circuit 230, and a controller 240.

The input circuit 210 of the PLL-HG converter 200 further includes an active input switch S 211 and an input inductor L 212 connected in series to the input switch S 211, and a pair of input ports. The pair of the input ports includes a higher voltage input terminal 215 and a lower voltage input terminal 216 each configured to be connected to a higher voltage output port and a lower voltage output port of a DC voltage source 217 with an input voltage V. The input inductor L212 includes a positive contact 2121 and a negative contact 2122, and an active input switch S 211 includes a positive port 2111, a negative port 2112 and a gate port 2113, where the positive contact 2121 of the input inductor L212 is connected to the higher voltage input terminal 215, and the negative contact 2122 of the input inductor L212 is connected to the positive port 2111 of the active input switch S 211, the negative port 2112 of the active input switch S 211 is connected the lower voltage input terminal 216, and the gate port 2113 of the active input switch S 211 is connected to a first output port 2441 of the controller 240.

The PLL, denoted by PLLj (j=1, ..., n, n≥1), further includes an active leg switch $S_j$ 221j, a leg inductor $L_j$ 222j, a leg capacitor $C_j$ 223j, and a leg diode $D_j$ 224j. A positive port 221j1 of the active leg switch $S_j$ 221j is connected to the higher voltage input terminal 215, a negative port 221j2 of the active leg switch $S_j$ 221j is connected to a positive contact 222j1 of the leg inductor $L_j$ 222j and to the positive contact 223j1 of the leg capacitor $C_j$ 223j, and a gate port 221j3 of the active leg switch $S_j$ 221j is connected to the first output port 2441 of the controller 240, the negative contact 223j2 of the leg capacitor $C_j$ 223j is connected to the positive port 224j1 of the leg diode $D_j$ 224j, and the negative port 224j2 of the leg diode $D_j$ 224j is connected to a negative contact 222j2 of the leg inductor $L_j$ 222j, and the negative contact 222j2 of the leg inductor $L_j$ 222j is further connected to i) the lower voltage input terminal 216 when j=1, or ii) to a positive port 224(j−1)1 of a leg diode $D_{j-1}$ 224(j−1) when j≥2.

The output circuit 230 further includes an active output switch $S_o$ 231, an output capacitor $C_o$ 233, an output diode D 234, a pair of output terminals comprising a higher voltage output terminal 235 and a lower voltage output terminal 236. A positive port 2311 of the active output switch $S_o$ 231 is connected to the negative contact 2122 of the input inductor L 212, directly or via an output switch diode $D_o$ 237 which may be inserted in series to the active output switch S, 231, a negative port 2312 of the active output switch $S_o$ 231 is connected to a positive contact 223n1 of a leg capacitor C, 223n, and a gate port 2313 of the active output switch $S_o$ 231 is connected to a second output port 2442 of the controller 240. A positive port 2341 of the output diode D 234 is connected to a terminal A which is connected to the positive port 2311 of the active output switch $S_o$ 231 or a positive port 2371 of an output switch diode $D_o$ 237 when it was inserted between the port A and the positive port 2311 of the active output switch $S_o$ 231. A negative port 2342 of the output diode D 234 is connected to a positive contact 2331 of the output capacitor $C_o$ 233, a negative contact 2332 of the output capacitor $C_o$ 233 is connected to the negative contact 223n2 of the leg capacitor $C_n$ 223n, and each of the higher voltage output terminal 235 and the lower voltage output terminal 236 is connected to the positive contact 2331 and the negative contact 2332 of the output capacitor $C_o$ 233, respectively, and is configured to be connected to a higher voltage input port and a lower voltage input port of an external load R 238, respectively. The active output switch $S_o$ 231 is employed to achieve wide duty range and high voltage gain. The output switch diode $D_o$ 237 may be inserted to realize a unidirectional current through the active output switch $S_o$ 231. Each of the active input switch S211, the active leg switches $S_j$ (j=1, . . . , n) 221j and the active output switch $S_o$ 231 may be accompanied by or integrated with a protective diode 2114, 221j4, 2314 connected in antiparallel, respectively.

The controller 240 includes a circuitry 241, a programmed instruction 242, an input port 243 monitoring an operating condition including the input voltage and output voltage, and output ports 244 of control signals, the first output port 2441 is connected to the gate port 2113 of the active input switch S211 and the gate ports 221j3 of the active leg switches $S_j$ (j=1, . . . , n), and the second output port 2442 is connected to the gate port 2313 of the active output switch $S_o$ 231, where the controller 240 is further configured to:

turn on the active input switch S 211 and the active leg switches $S_j$ (j=1, . . . , n) 221j and maintain turn on states of them while maintaining the active output switch $S_o$ 231 at a turn off state for a first duty cycle period $k_1T$, where T=1/f denotes a complete switching cycle, f denotes a switching frequency;

turn off the active input switch S211 and the active leg switches $S_j$ (j=1, . . . , n) 221j, maintain turn off states of them, and turn on the active output switch $S_o$ 231 and maintain a turn on state of it for a second duty cycle period $k_2T$ following the first duty cycle period; and turn off the active output switch $S_o$ 231 and maintain the turn off state of it while maintaining also turn off states of the active input switch S211 and the active leg switches S, (j=1, . . . , n) 221j for a remaining time span $(1-k_1-k_2)T$ following the second duty cycle period.

In the analysis presented hereafter, it is assumed that the DC voltage source 217 with an input voltage $V_i$ is connected between the higher voltage input terminal 215 and the lower voltage input terminal 216, and the external load 238 with resistance R is connected between the higher voltage output terminal 235 and the lower voltage output terminal 236. All the inductors are assumed to have an equal inductance L and the leg capacitors are assumed to have an equal capacitance C. All the switches are triggered with a switching frequency f.

Continuous Conduction Mode Operation of PLL-HG Converter

Figure 3:
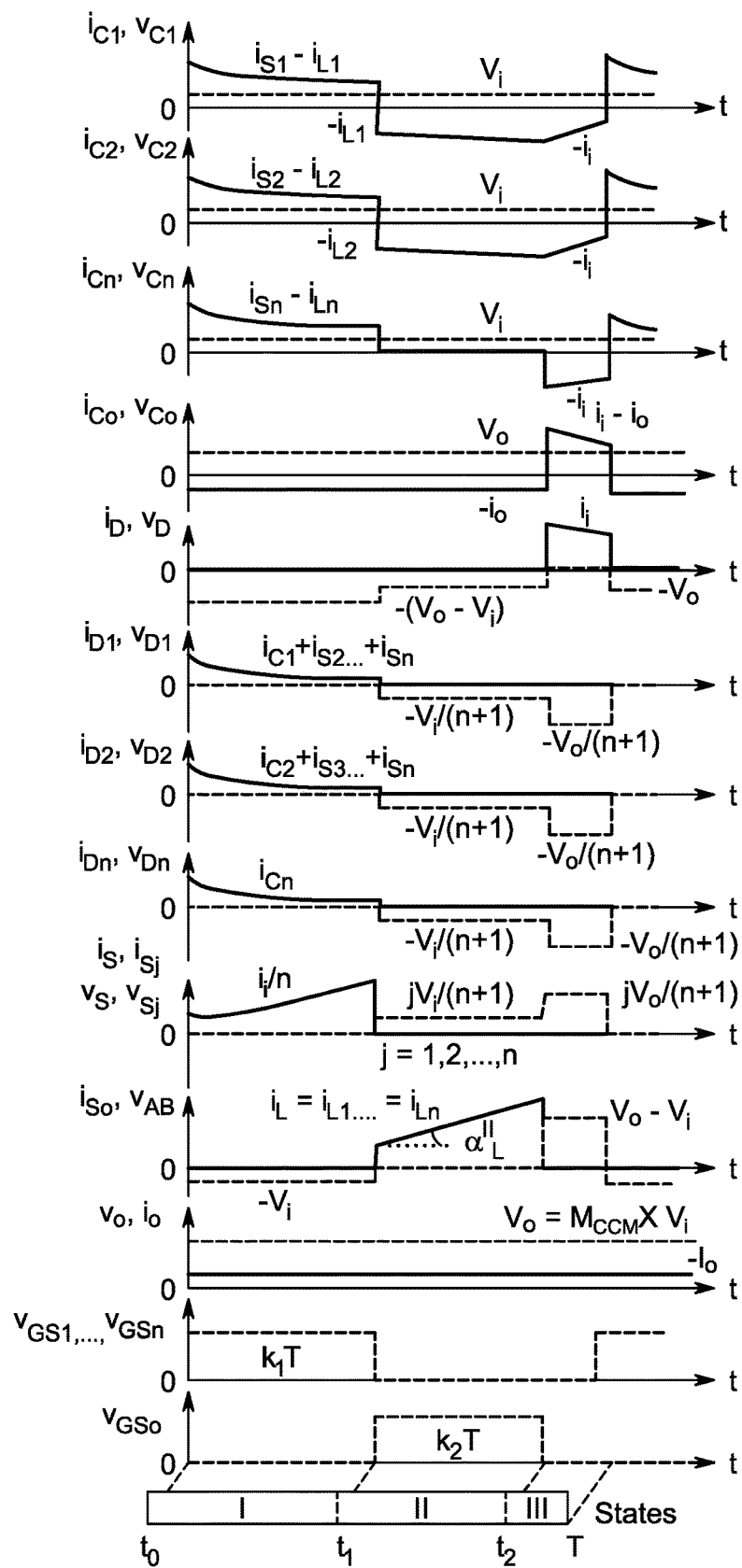
FIG. 3 illustrates exemplary characteristic waveforms for capacitors, diodes and switches of the PLL-HG converter illustrated in FIG. 2 when operated under Continuous Conduction Mode (CCM).

FIG. 3 illustrates typical characteristic waveforms for the capacitors, diodes and switches of the PLL-HG converter of FIG. 2 according to certain embodiments when operated under Continuous Conduction Mode (CCM). As illustrated here, in the CCM mode, a total switching period T is divided into three states I, II and III defined by the duty cycle periods $k_1T$ and $k_2T$, where the duty ratio $k_1$ and $k_2$ are given by $(t_1-t_0)/T$ and $(t_2-t_1)/T$, respectively.

Figure 4:
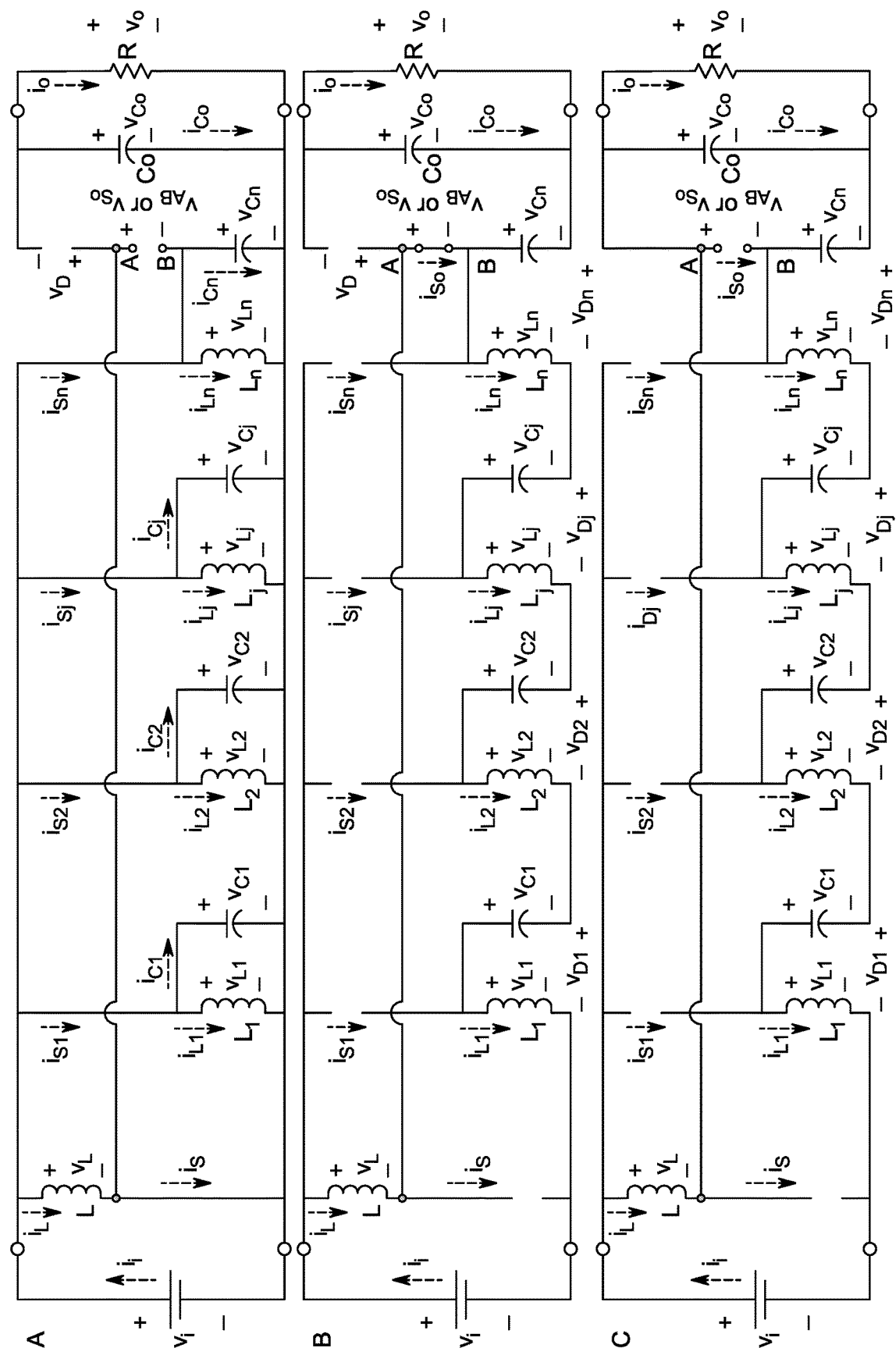
FIG. 4 illustrates equivalent circuits of the PLL-HG converter illustrated in FIG. 2 where FIGS. 4A, 4B and 4C corresponds to the states I, II and III of the CCM operation, respectively.

FIG. 4 illustrates equivalent circuits of the PLL-HG converter of FIG. 2 according to certain embodiments operated under the CCM mode, where FIGS. 4 A, B and C corresponds to the states I, II and III of the CCM operation, respectively.

In the state I, corresponding to FIG. 4 A, a gate pulse I with a duty ratio $k_1$ defining the first duty cycle period $k_1T$ turns on the active input switch S and the active leg switches $S_j$ (j=1, . . . , n) of all the parallel legs, maintains turn on states of those switches while maintaining the active output switch $S_o$ at off state, and realizes a state I. All the leg diodes are under forward biased condition, while the output diode is under reverse biased condition for the state I. Then, the gate pulse I turns off the active input switch S and the active leg switches $S_j$ (j=1, . . . , n), maintains turn off states of those switches, and a gate pulse II with a duty ratio $k_2$ defining the second duty cycle period $k_2T$ following the first duty cycle period $k_1T$ turns on the active output switch $S_o$, realizing the state II, corresponding to FIG. 4 B. The leg diodes and the output diode are all under reverse biased condition, for the state II. Further, the gate pulse II turns off the active output switch $S_o$ at an end of the second duty cycle period $k_2T$, realizing a state III. For remaining period $(1-k_1-k_2)T$, all of the switches are turned off, corresponding to FIG. 4C. All the leg diodes are under reverse biased condition, while the output diode is under forward biased condition for the state III. It is noteworthy that the gate pulse II for the active output switch S, is delayed by a time period $k_1T$ from the gate pulse I for the switches S and $S_j$ (j=1, . . . , n). Moreover, a sum of duty ratio $k_1$ and $k_2$ is always less than 1.

Figure 5:
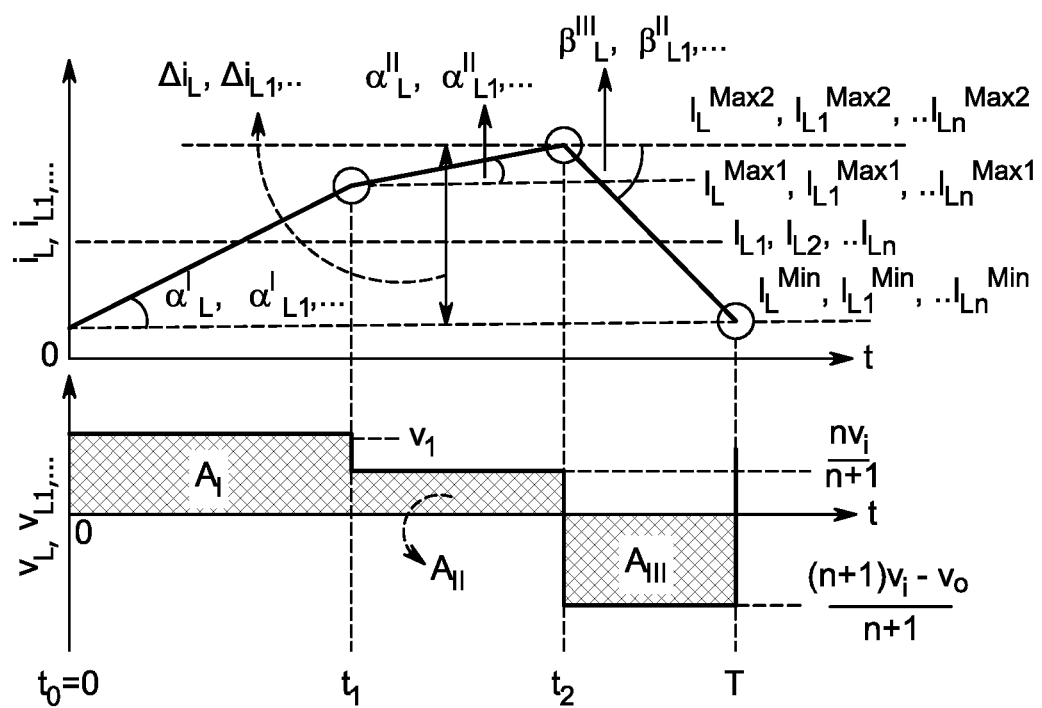
FIG. 5 illustrates exemplary time dependences of voltages and currents across/through the input inductor and the leg inductors of the PLL-HG converter illustrated in FIG. 2 when operated in the CCM with the states I, II and III.

FIG. 5 illustrates exemplary time dependences of voltages $v_L, V_{L1}, \ldots, V_{Ln}$ and currents $i_L, i_{L1}, \ldots, i_{Ln}$ for the input inductor L and the leg inductors $L_1, L_2, \ldots, L_n$ of the PLL-HG converter illustrated in FIG. 2 when operated under the CCM mode with the states I, II and III. Here, $\alpha^I_L, \alpha^I_{L1}, \alpha^I_{L2}, \ldots, \alpha^I_{Ln}$ denote charging angles for the inductors L, $L_1, L_2, \ldots, L_n$ in state I, namely the first duty cycle period, respectively, $\alpha^{II}_L, \alpha^{II}_{L1}, \alpha^{II}_{L2}, \ldots, \alpha^{II}_{Ln}$ are the charging angles for the inductor L, $L_1, L_2, \ldots, L_n$ in state II, namely the second duty cycle period, respectively, $\beta^{III}_L, \beta^{III}_{L1}, \beta^{III}_{Ln}$ denote discharging angles for the inductor L, $L_1, L_2, \ldots, L_n$ in state III, namely the remaining time period, respectively. As illustrated in FIG. 5, under the CCM operation, a certain amount of currents continues to flow through the inductors in the input circuit and the PLL. However, a net increment of the current flowing through an inductor is zero for the total period T of switching cycle. Therefore, taking into a relation $$v_L = L\frac{di_L}{dt}, \text{ or } v_L \Delta t \cong L \Delta i_L$$

and algebraic summing over the total period T, areas $A_I$, $A_{II}$, and $A_{III}$ illustrated in the time dependences of the inductor voltage for states I, II, and III, respectively, satisfy following relation, which is called volt-second balance principle.

$$A_I + A_{II} + A_{III} = 0 \tag{1}$$

1) State-I $[t_0\text{-}t_1]$

The equivalent circuit for the state I is shown in FIG. 4A. In this state, the switches S, $S_1$, $S_2$, . . . , and $S_n$ are turned ON, and the switch $S_o$ is turned OFF. During this state, inductor L is charged by input voltage $V_i$ through switch S, inductor $L_1$ is charged by input voltage $V_i$ through switch $S_1$, . . . , and inductor $L_n$ is charged by input voltage $V_i$ through switch $S_n$. At the same time, capacitors $C_1$, $C_2$, . . . , and $C_n$ are also charged from input voltage $V_i$ through switches $S_1$, $S_2$, . . . , and $S_n$, respectively. It is noteworthy that all the reactive components L, $L_1$, $L_2$, . . . , $L_n$, $C_1$, $C_2$, . . . , and $C_n$ are charged in parallel. Throughout this state, diode $D_1$, $D_2$, . . . , $D_n$ are forward biased, and diodes $D_o$ and D are reverse biased. The load R is supplied by the stored energy of capacitor $C_o$.

The voltages across the inductors L, $L_1$, $L_2$, . . . , $L_n$ are obtained as, $$v_L = v_{L1} = v_{L2} \cdots = v_{Ln} \approx V_i \tag{2}$$

The voltages across capacitors $C_o$, $C_1$, $C_2$, . . . , and $C_n$ are obtained as, $$v_{C1} = v_{C2} \cdots = v_{Cn} \approx V_i; v_{Co} \approx V_o \tag{3}$$

The input and output currents are obtained as, $$i_i = i_L + \Sigma_{u=1}^n i_{Lu} + \Sigma_{u=1}^n i_{Cu}, i_o = -i_{Co} \approx V_o / R \tag{4}$$

During the state I, the currents through the inductor L, $L_1$, $L_2$, . . . , and $L_n$ are linearly increase with slope $\tan(\alpha^I_L)$, $\tan(\alpha^I_{L1})$, $\tan(\alpha^I_{L2})$, . . . , and $\tan(\alpha^I_{Ln})$, respectively, as illustrated in FIG. 4. The charging angles for the inductors L, $L_1$, $L_2$, . . . , and $L_n$ can be obtained as follows, $$\begin{cases} \alpha^I_L = \tan^{-1}\left(\frac{f}{k_1}(I_L^{Max1} - I_L^{Min})\right) = \tan^{-1}\left(\frac{V_i}{L}\right) \\ \alpha^I_{L1} = \tan^{-1}\left(\frac{f}{k_1}(I_{L1}^{Max1} - I_{L1}^{Min})\right) = \tan^{-1}\left(\frac{V_i}{L_1}\right) \\ \vdots \\ \alpha^I_{Ln} = \tan^{-1}\left(\frac{f}{k_1}(I_{Ln}^{Max1} - I_{Ln}^{Min})\right) = \tan^{-1}\left(\frac{V_i}{L_n}\right) \end{cases} \tag{5}$$

Using Equation (5) and based on assumption that all the inductors have an equal inductance L, the relations between inductors discharging angles can be found as, $$\alpha^I_L = \alpha^I_{L1} = \cdots = \alpha^I_{Ln} \tag{6}$$

Therefore, it is noteworthy to mention that the charging angles in state I for all of the inductors' current are same.

2) State-II $[t_1\text{-}t_2]$

The equivalent circuit for this state is shown in FIG. 4B. In this state, switches S, $S_1$, $S_2$, . . . , $S_n$ are turned OFF, and switch $S_o$ is turned ON. During this state, inductor L, $L_1$, . . . , and $L_n$ are charged in series by the input voltage $V_i$ and voltage across capacitor $C_1$, $C_2$, . . . , $C_{n-1}$. Throughout this state, diodes D, $D_1$, $D_2$, . . . , $D_n$ are reverse biased, and capacitors $C_1$, $C_2$, . . . , and $C_{n-1}$ are discharged in series. The load R is supplied by the stored energy of capacitor $C_o$. The relation between voltages across inductors and capacitors can be obtained as, $$v_L + \Sigma_{u=1}^n v_{Lu} \approx V_i + \Sigma_{u=1}^{n-1} v_{Cu} \tag{7}$$

The voltages across capacitors $C_o$, $C_1$, $C_2$, . . . , and C, are obtained as, $$v_{C1} = v_{C2} = \cdots = v_{Cn} \approx V_i; v_{Co} \approx V_o \tag{8}$$

Using Equations (7) and (8), the voltages across inductors L, $L_1$, $L_2$, . . . , and $L_n$ are obtained as, $$v_L = v_{L1} = v_{L2} = \cdots = v_{Ln} \approx \frac{nV_i}{n+1} \tag{9}$$

The input and output currents are obtained as, $$\begin{cases} i_o = -i_{Co} \approx V_o/R, i_{Cn} = 0 \\ i_i = i_{L1} = i_{L2} = \cdots = i_{Ln} = i_{C1} = i_{C2} = \cdots = i_{Cn-1} \end{cases} \tag{10}$$

In this state, the currents through inductors L, $L_1$, $L_2$, . . . , and $L_n$ are linearly increased with slope $\tan(\alpha^{II}_L)$, $\tan(\alpha^{II}_{L1})$, $\tan(\alpha^{II}_{L2})$, . . . , and $\tan(\alpha^{II}_{Ln})$, respectively. The charging angles for inductors L, $L_1$, $L_2$, . . . , and $L_n$ can be obtained as follows, $$\begin{cases} \alpha^{II}_L = \tan^{-1}\left(\frac{f}{k_2}(I_L^{Max2} - I_L^{Max1})\right) = \tan^{-1}\left(\frac{nV_i}{(n+1)L}\right) \\ \alpha^{II}_{L1} = \tan^{-1}\left(\frac{f}{k_2}(I_{L1}^{Max2} - I_{L1}^{Max1})\right) = \tan^{-1}\left(\frac{nV_i}{(n+1)L_1}\right) \\ \vdots \\ \alpha^{II}_{Ln} = \tan^{-1}\left(\frac{f}{k_2}(I_{Ln}^{Max2} - I_{Ln}^{Max1})\right) = \tan^{-1}\left(\frac{nV_i}{(n+1)L_n}\right) \end{cases} \tag{11}$$

Using Equation (11), the relations between inductors discharging angles can be found as, $$\alpha^{II}_1 = \alpha^{II}_2 = \cdots = \alpha^{II}_n \tag{12}$$

Therefore, it is noteworthy to mention that the charging angles in state II for all the inductors are same.

3) State-III $[t_1\text{-}t_2]$

The equivalent circuit for this state is shown in FIG. 5C. In this state, all of the input switches S, the leg switches $S_1$, $S_2$, . . . , $S_n$ and the active output switch $S_o$ are turned OFF. During this state, the inductors L, $L_1$, . . . , $L_n$, and the leg capacitors $C_1$, $C_2$, . . . , $C_n$ are discharged in series with the input voltage $V_i$ to provide energy to load R and capacitor $C_o$. Throughout this state, the output diode D is forward biased and the leg diodes $D_1$, $D_2$, . . . , $D_n$ and the output switch diode $D_o$ are reverse biased. Relation between voltages across inductors and those across capacitors can be obtained as, $$v_L + \Sigma_{u=1}^n v_{Lu} \approx V_i + \Sigma_{u=1}^n v_{Cu} - V_o \tag{13}$$

The voltages across the leg capacitors $C_1$, $C_2$, . . . , and $C_n$ and the output capacitor $C_o$ are obtained as, $$v_{C1} = v_{C2} = \cdots = v_{Cn} \approx V_i; v_{Co} \approx V_o \tag{14}$$

Using Equations (13) and (14), the voltages across inductors L, $L_1$, $L_2$, . . . , and $L_n$ are obtained as, $$v_L = v_{L1} = v_{L2} = \cdots = v_{Ln} \approx V_i - \frac{V_o}{n+1} \tag{15}$$

The input and output currents are obtained as, $$i_i = i_{L1} = \cdots = i_{Ln} = i_{C1} = \cdots = i_{Cn-1} \approx i_{C_o} + \frac{V_o}{R} \quad (16)$$

In this state, the currents through the input inductor L and the leg inductors $L_1, L_2, \ldots, L_n$ are linearly decreased with slope $\tan(\beta^{III}_L)$, $\tan(\beta^{III}_{L1})$, $\tan(\beta^{III}_{L2})$, ..., and $\tan(\beta^{III}_{Ln})$ respectively. The discharging angles for inductors L, $L_1$, $L_2, \ldots,$ and $L_n$ can be obtained as follows, $$\begin{cases} \beta^{III}_L = \tan^{-1}\left(\frac{I_L^{Min} - I_L^{Max2}}{(1-k_1-k_2)/f}\right) = \tan^{-1}\left(\frac{(n+1)V_i - V_o}{(n+1)L}\right) \\ \beta^{II}_{L1} = \tan^{-1}\left(\frac{I_{L1}^{Min} - I_{L1}^{Max2}}{(1-k_1-k_2)/f}\right) = \tan^{-1}\left(\frac{(n+1)V_i - V_o}{(n+1)L_1}\right) \\ \vdots \\ \beta^{II}_{Ln} = \tan^{-1}\left(\frac{I_{Ln}^{Min} - I_{Ln}^{Max2}}{(1-k_1-k_2)/f}\right) = \tan^{-1}\left(\frac{(n+1)V_i - V_o}{(n+1)L_n}\right) \end{cases} \quad (17)$$

Using Equation (17), the relations between inductors discharging angles can be found as, $$\beta^{III}_L = \beta^{III}_{L1} = \cdots = \beta^{III}_{L_n} \quad (18)$$

Therefore, it is noteworthy that the discharging angles in state III for all the inductors are same.

The voltage gain of PLL-HG converter in CCM is derived as, $$M_{CCM} \text{ or } M = \frac{V_o}{V_i} = \frac{(n+1) - k_2}{1 - k_1 - k_2} \quad (19)$$

Table I summarizes voltage stresses across switches and Peak Inverse Voltages (PIV) against diodes for each state. Notably, the voltage stress across switches is reduced down to $1/(n+1)$ for switch in the input circuit and to $j/(n+1)$ for switches in the PLLj (j=1, ..., n, n≥1).

TABLE I

VOLTAGE STRESS ACROSS SWITCHES AND PIV OF DIODES

| Switches | State I | State II | State III |
|---|---|---|---|
| S | 0 | $V_i(n+1)^{-1}$ | $V_o(n+1)^{-1}$ |
| $S_j$ (j = 1 to n) | 0 | $jV_i(n+1)^{-1}$ | $jV_o(n+1)^{-1}$ |
| $S_o$ (if $D_o$ is absent) | $-V_i$ | 0 | $V_o - V_i$ |
| $S_o$ (if $D_o$ is present) | 0 | 0 | $V_o - V_i$ |
| D | $-V_o$ | $-(V_o - V_i)$ | 0 |
| $D_1, D_2, \ldots, D_n$ | 0 | $-V_i(n+1)^{-1}$ | $-V_o(n+1)^{-1}$ |
| $D_o$ | $-V_i$ | 0 | 0 |

Also the PIV for the diodes in the PLL are reduced down by the same factor $1/(n+1)$. This feature of the PLL-HG under certain embodiments is beneficial from both stand point of reliability and cost in designing the PLL, because higher voltage stress leads to lower reliability and also higher rating of components.

B. Discontinuous Conduction Mode Operation of PLL-HG Converter

Figure 6:
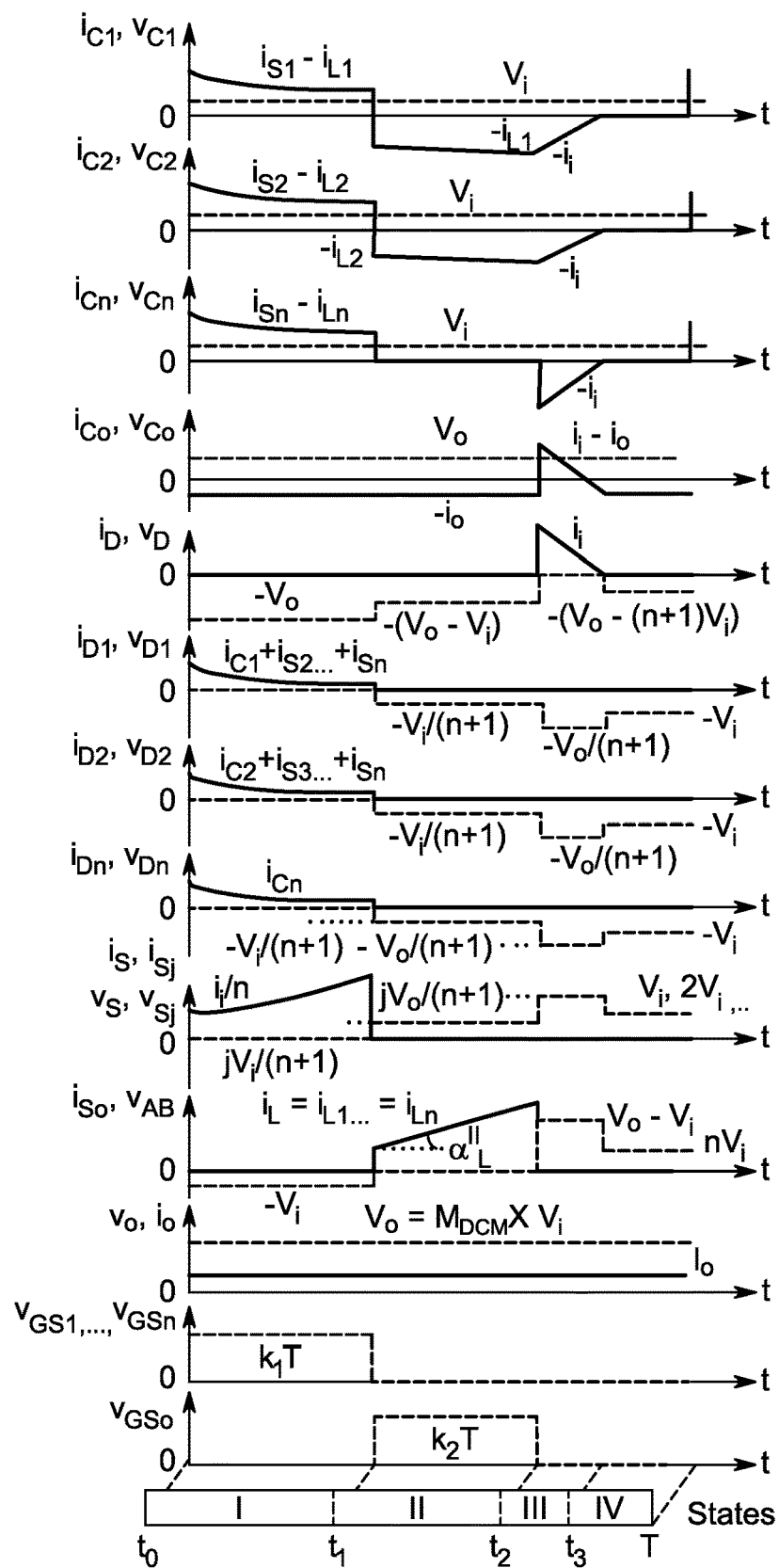
FIG. 6 illustrates exemplary characteristics waveforms of voltages and currents for capacitors, diodes and switches of the PLL-HG converter illustrated in FIG. 2 when operated in the Discontinuous Conduction Mode (DCM) with the four states I to IV.

FIG. 6 illustrates waveforms of voltages and currents for capacitors, diodes and switches of the PLL-HG converter according to certain embodiments illustrated in FIG. 2 when operated under Discontinuous Conduction Mode (DCM). As illustrated here, in the DCM mode, the total period T is divided into four states I to IV defined by the duty cycles periods $k_1T$, $k_2T$, $k_3T$, and the $(1-k_2-k_3)T$.

Figure 7:
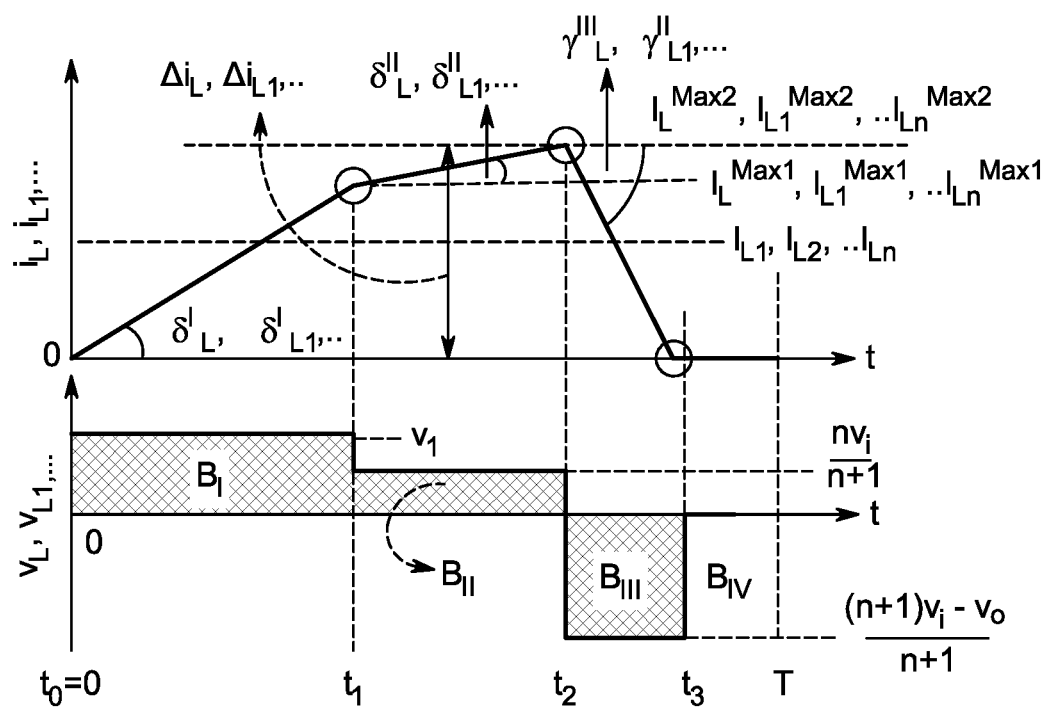
FIG. 7 illustrates exemplary time dependences of voltages and currents across/through the input inductor and the leg inductors of the PLL-HG converter illustrated in FIG. 2 when operated in the DCM with the four states I to IV.

FIG. 7 illustrates exemplary time dependences of voltages and currents across/through the input inductor and the leg inductors of the PLL-HG converter illustrated in FIG. 2 when operated under the DCM with the four states I to IV. As illustrated, all of the currents through the inductors reduce down to zero at the end of the state III. Here, $\delta^I_L$, $\delta^I_{L1}$, $\delta^I_{L2}, \ldots, \delta^I_{Ln}$ denote charging angles for the inductors L, $L_1$, $L_2, \ldots, L_n$ in state I, respectively, $\delta^{II}_L$, $\delta^{II}_{L1}$, $\delta^{II}_{L2}, \ldots, \delta^{II}_{Ln}$ denote charging angles for the inductors L, $L_1, L_2, \ldots, L_n$ in state II, respectively, $\gamma^{III}_L$, $\gamma^{III}_{L1}$, $\gamma^{III}_{L2}, \ldots, \gamma^{III}_{Ln}$ denote the discharging angles for the inductors L, $L_1, L_2, \ldots, L_n$ in state III, respectively. $B_I$, $B_{II}$, $B_{III}$ and $B_{IV}$ are areas covered by inductor currents waveform in state I, II, III, and IV, respectively.

1) State-I $[t_0-t_1]$

This state is same as the state I of the CCM and equivalent circuitry is same as shown in FIG. 4A, except for a factor that the current through the inductors are zero at the time $t_0$, the starting point of the period. The currents through the inductors L, $L_1, L_2, \ldots, L_n$ linearly increase and reach maximum values, at an end of the state I, at time $t_1=k_1T$. Thus the maximum values can be derived using the charging angles as follows, $$\begin{cases} I_L^{Max1} = L^{-1}V_ik_1T = k_1T\tan(\delta^I_L) \\ I_{L1}^{Max1} = L_1^{-1}V_ik_1T = k_1T\tan(\delta^I_{L1}) \\ \vdots \\ I_{Ln}^{Max1} = L_n^{-1}V_ik_1T = k_1T\tan(\delta^I_{Ln}) \end{cases} \quad (20)$$

It is noteworthy that charging angles $\delta^I_L$, $\delta^I_{L1}$, $\delta^I_{L2}, \ldots, \delta^I_{Ln}$ in state I for inductors L, $L_1, L_2, \ldots, L_n$, respectively are equal for all the inductors, thus the currents through the inductors L, $L_1, L_2, \ldots,$ and $L_n$ reach to a same maximum level, since all the inductances are equal to L;

$$I_L^{Max1} = I_{L1}^{Max1} = \cdots = I_{Ln}^{Max1} \quad (21)$$

2) State-II $[t_1-t_2]$

This state is same as the state II of the CCM and equivalent circuitry is same as shown in FIG. 4B. The currents through the inductors L, $L_1, L_2, \ldots, L$, linearly increase further and reach their maximum values at time $t_2=(k_1+k_2)T$, the maximum values can be derived as follows, $$\begin{cases} I_L^{Max2} = I_L^{Max1} + \frac{nV_ik_2T}{(n+1)L} = k_1T\tan(\delta^I_L) + k_2T\tan(\delta^{II}_L) \\ I_{L1}^{Max2} = I_{L1}^{Max1} + \frac{nV_ik_2T}{(n+1)L_1} = k_1T\tan(\delta^I_{L1}) + k_2T\tan(\delta^{II}_{L1}) \\ \vdots \\ I_{Ln}^{Max2} = I_{Ln}^{Max1} + \frac{nV_ik_2T}{(n+1)L_n} = k_1T\tan(\delta^I_{Ln}) + k_2T\tan(\delta^{II}_{Ln}) \end{cases} \quad (22)$$

It is noteworthy that the maximum values are equal for all of the inductors L, $L_1, L_2, \ldots,$ and $L_n$:

$$I_L^{Max2} = I_{L1}^{Max2} = \cdots = I_{Ln}^{Max2} \quad (23)$$

3) State-III $[t_2-t_3]$

This state is same as the state III of CCM and equivalent circuitry is same as shown in FIG. 4C. The currents through the inductors L, $L_1, L_2, \ldots, L_n$ linearly decrease down to zero at an end of the state III, at the time $t_3$, and their maximum reduction amounts can be derived as follows, $$\begin{cases} I_L^{Max2} = \left(\frac{V_o - (n+1)V_i}{(n+1)L}\right)k_3 T = -k_3 T \tan(\gamma_L^{III}) \\ I_{L1}^{Max2} = \left(\frac{V_o - (n+1)V_i}{(n+1)L1}\right)k_3 T = -k_3 T \tan(\gamma_{L1}^{III}) \\ \vdots \\ I_{Ln}^{Max2} = \left(\frac{V_o - (n+1)V_i}{(n+1)Ln}\right)k_3 T = -k_3 T \tan(\gamma_{Ln}^{III}) \end{cases} \quad (24)$$

4) State-IV [$t_3$-T]

Figure 8:
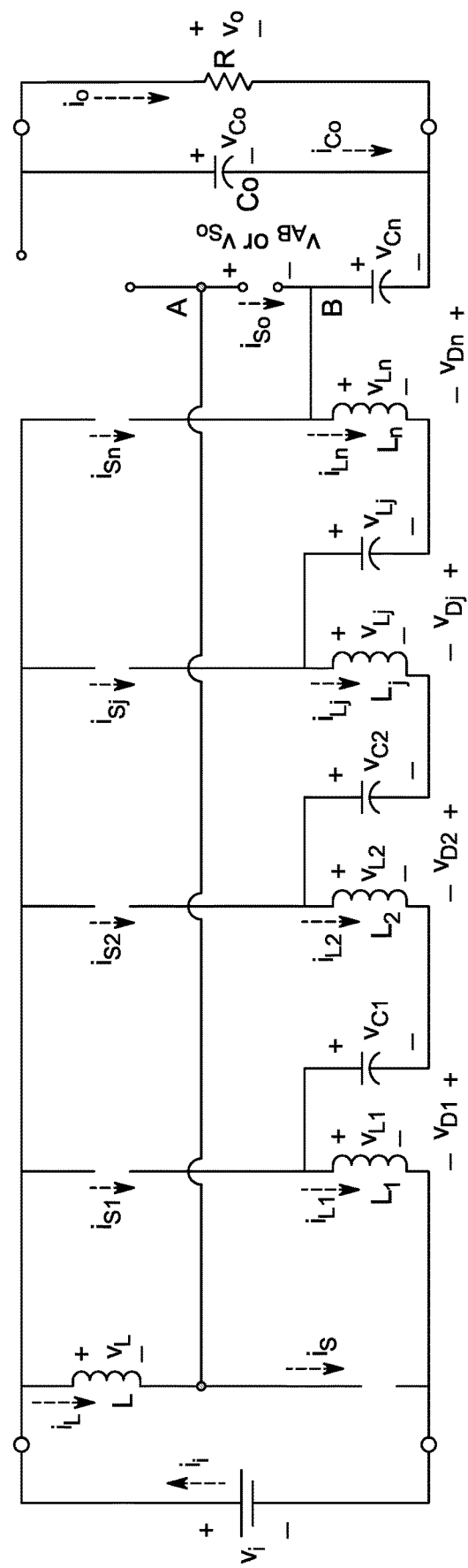
FIG. 8 is an exemplary equivalent circuit corresponding to the state IV of the DCM operation of the PLL-HG converter illustrated in FIG. 2.

FIG. 8 is an exemplary equivalent circuit corresponding to the state IV of the DCM operation of the PLL-HG converter illustrated in FIG. 2. In this state, all the switches are turned OFF and all diodes are reverse biased including the output diode D additionally. During this state, the currents through all the inductors are zero, and the load R is supplied by a stored energy in the output capacitor $C_o$, as in the state-II.

When the duty ratios $k_1$ and $k_2$ were given, a condition for the value of $k_3$ to give the time $t_3$ when the currents through the inductors reach zero level can be obtained as follows. A net increment of the current flowing through an inductor is zero for the total period T of switching cycle, as discussed in the CCM. Applying the volt-second balance principle Equation (1) and from FIG. 6, $$B_I + B_{II} - B_{III} = 0 \quad (25)$$

$$V_{LI} k_1 T + V_{LII} k_2 T + V_{LIII} k_3 T = 0, \quad (26)$$

where, $$V_{LI} \cong V_i,\ V_{LII} \cong \frac{nV_i}{(n+1)},\ \text{and}\ V_{LIII} \cong V_i - \frac{V_o}{(n+1)} \quad (27)$$

$$V_i k_1 + \frac{nV_i}{(n+1)} k_2 + \left[V_i - \frac{V_o}{(n+1)}\right] k_3 \cong 0 \quad (28)$$

Thus, $$(n+1)V_i k_1 + nV_i k_2 + [(n+1)V_i - V_o] k_3 \cong 0 \quad (29)$$

$$k_3 \cong \frac{V_i[(n+1)k_1 + nk_2]}{V_o - (n+1)V_i} \quad (30)$$

The average current $I_{Co}$ through the output capacitor $C_o$ can be derived as $$I_{Co} = \frac{1}{T}\int_0^T i_{C_0}(t)dt = \frac{1}{T}\int_0^{t_1} i_{C_0}(I)dt + \frac{1}{T}\int_{t_1}^{t_2} i_{C_0}(II)dt + \frac{1}{T}\int_{t_2}^{t_3} i_{C_0}(III)dt + \frac{1}{T}\int_{t_3}^T i_{C_0}(IV)dt, \quad (31)$$

where, using Equation (4) for $i_{C_o}(I)$, Equation (10) for $i_{C_o}(II)$ and $i_{C_o}(IV)$, Equations (16) and (24) for $i_{C_o}(III)$, $$I_{Co} = \frac{T}{2L}\frac{V_o - (n+1)V_i}{(n+1)} k_3^2 - \frac{V_o}{R}.$$

Inserting Equation (30) for $k_3$, $$I_{Co} = \frac{T}{2L}\frac{V_i^2[(n+1)k_1 + nk_2]^2}{(n+1)[V_o - (n+1)V_i]} - \frac{V_o}{R} \quad (32)$$

Under a steady state condition, the average current $I_{Co}$ is zero. Therefore, Equation (32) can be rewritten as follows, $$\frac{T}{2L}\frac{V_i^2[(n+1)k_1 + nk_2]^2}{(n+1)[V_o - (n+1)V_i]} = \frac{V_o}{R} \quad (33)$$

Solving Equation (33) as a quadratic equation on a ratio $$\left(\frac{V_o}{V_i}\right),$$

the voltage gain of PLL-HG converter for DCM is derived as, $$M' = M_{DCM} = \frac{(n+1)}{2} + \sqrt{\frac{(n+1)^2}{4} + \frac{[(n+1)k_1 + nk_2]^2}{2(n+1)\chi}}, \quad (34)$$

where, $\chi$ is a normalized inductor time constant defined by $$\chi \equiv L/RT = L_1/RT = \ldots = L_n/RT. \quad (35)$$

The boundary normalized inductor time constants $\chi_{LB}$ which gives an equal value between $M_{CCM}$ and $M_{DCM}$ can be derived as follows, $$\chi_{LB} = \frac{[(n+1)k_1 + nk_2](1 - k_1 - k_2)^2}{2[(n+1) - k_2](n+1)} \quad (36)$$

Figure 9A:
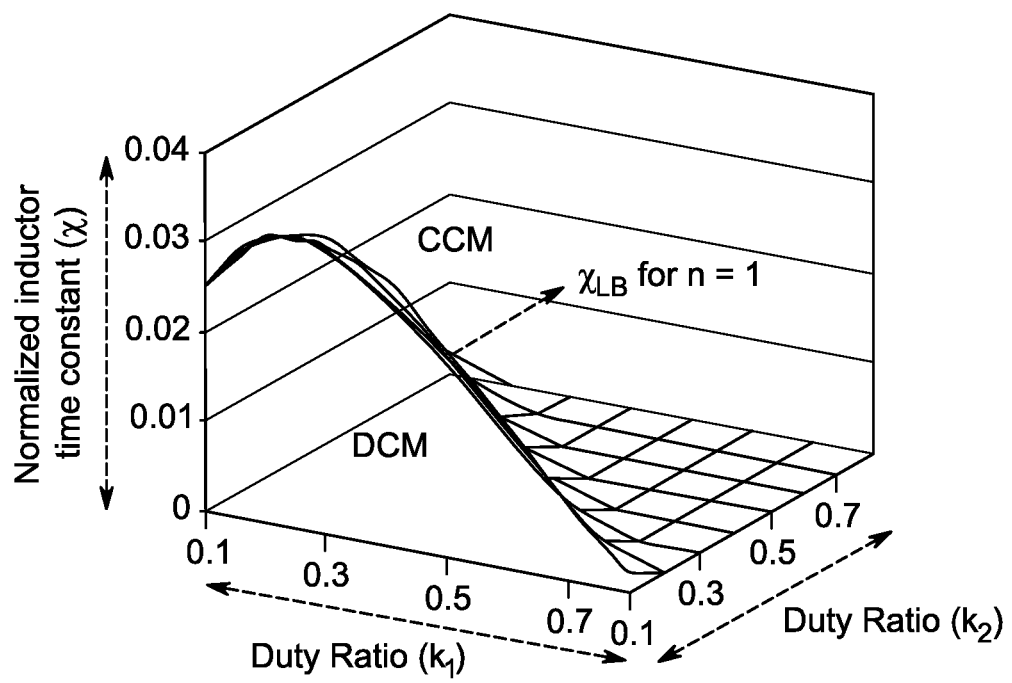
FIG. 9A is a graph illustrating the boundary normalized inductor time constants χ as a function of the duty ratios $k_1$ and $k_2$ when n=1
Figure 9B:
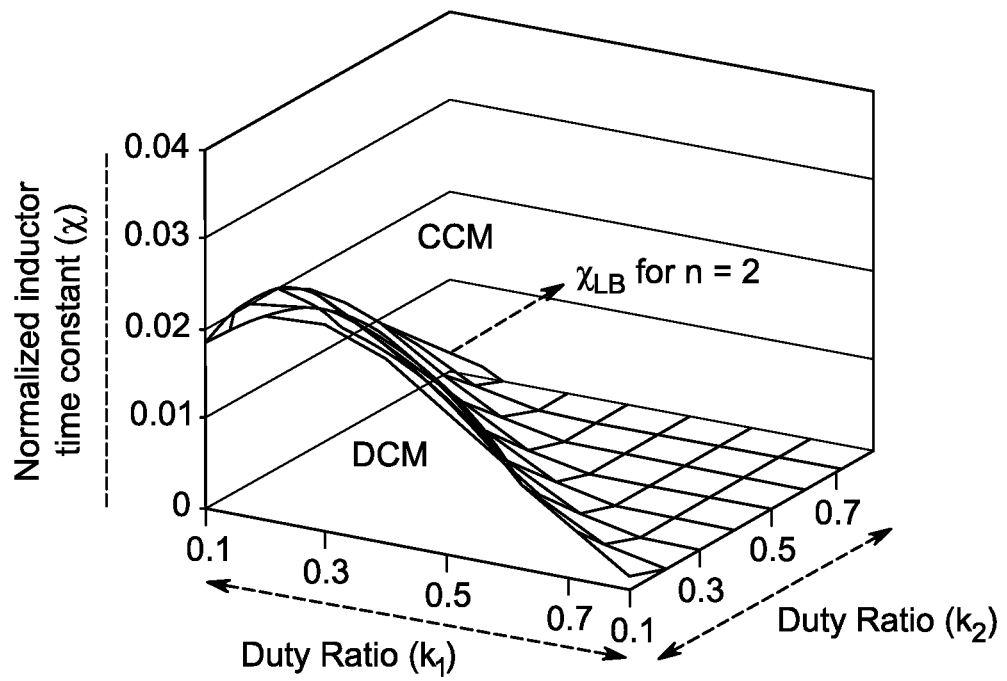
FIG. 9B is a graph illustrating the boundary normalized inductor time constants χ as a function of the duty ratios $k_1$ and $k_2$ when n=2.
Figure 9C:
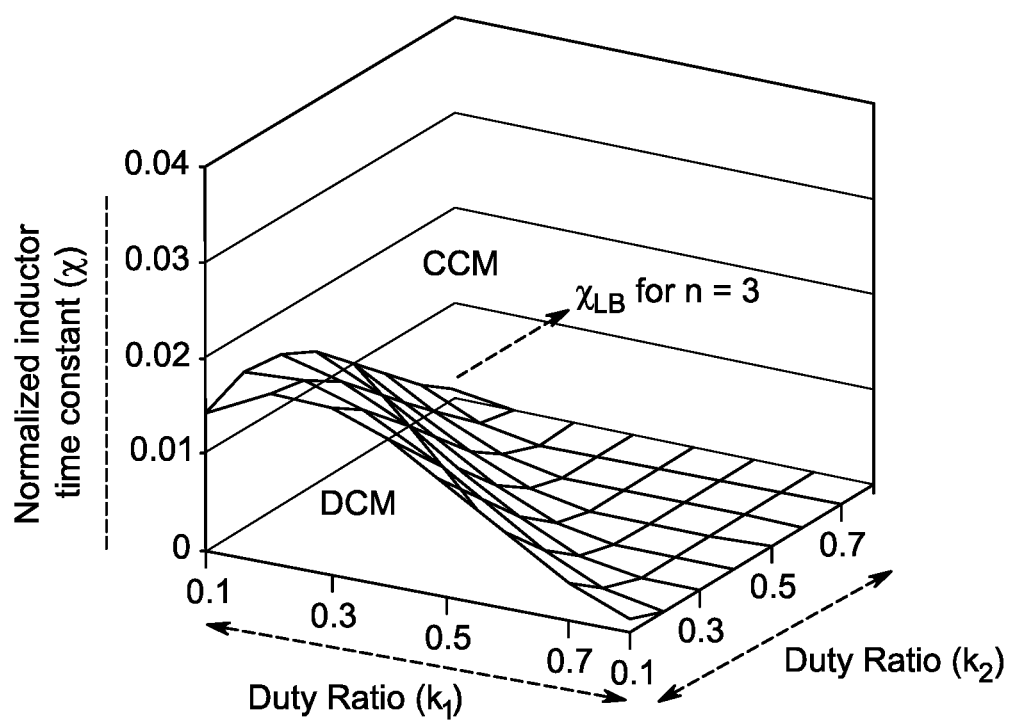
FIG. 9C is a graph illustrating the boundary normalized inductor time constants χ as a function of the duty ratios $k_1$ and $k_2$ when n=3.

FIG. 9 is a graph illustrating the boundary normalized inductor time constants $\chi_{LB}$ as a function of the duty ratios $k_1$ and $k_2$, where FIGS. 9A, 9B and 9C each corresponds to n=1, 2, and 3, respectively. Here the normalized inductor time constant $\chi$ is taken as a vertical axis and the curves indicate the boundary normalized inductor time constants $\chi_{LB}$. FIG. 9 also illustrates in which of the modes the PLL-HG converter operates when the normalized inductor time constant $\chi$ is larger or smaller than the boundary normalized inductor time constants $\chi_{LB}$. As observed here, the PLL-HG converter operates in DCM when $\chi$ is smaller than $\chi_{LB}$. Therefore, PLL-HG converter operates in CCM, when the following condition is satisfied;

$$\chi_{LB} = \frac{((n+1)k_1 + nk_2)}{(n+1)}\frac{(1 - k_1 - k_2)^2}{2((n+1) - k_2)} < \chi = \frac{L}{RT} = \frac{L_1}{RT} = \frac{L_2}{RT} = \ldots = \frac{L_n}{RT}. \quad (37)$$

It is also observed in FIG. 9 that the boundary normalized inductor time constants $\chi_{LB}$ exhibits decreasing tendency when the leg number n increases. This means a lower value of the normalized inductor time constant $\chi$, namely a lower inductance value of the inductors can satisfy the condition, Eq. (37) for realizing the operation in CCM, when the leg number n increases. This feature is also one of benefits of the PLL-HG converters according to certain embodiments of the present disclosures.

Figure 10A:
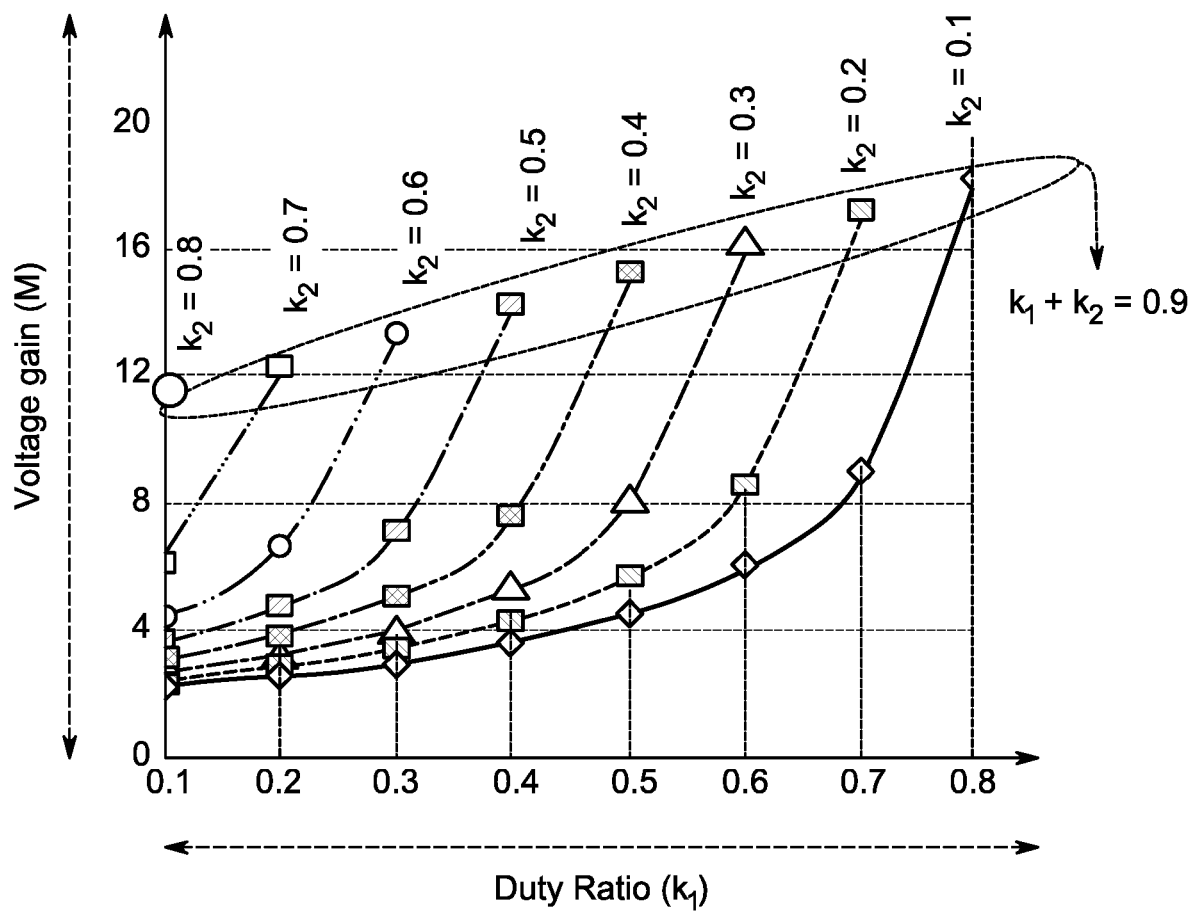
FIG. 10A is a graph illustrating voltage gains (M) estimated as a function of the duty ratio $k_1$ with the duty ration $k_2$ as a parameter for a PLL-HG converter under certain embodiments of the present disclosures for n=1.
Figure 10B:
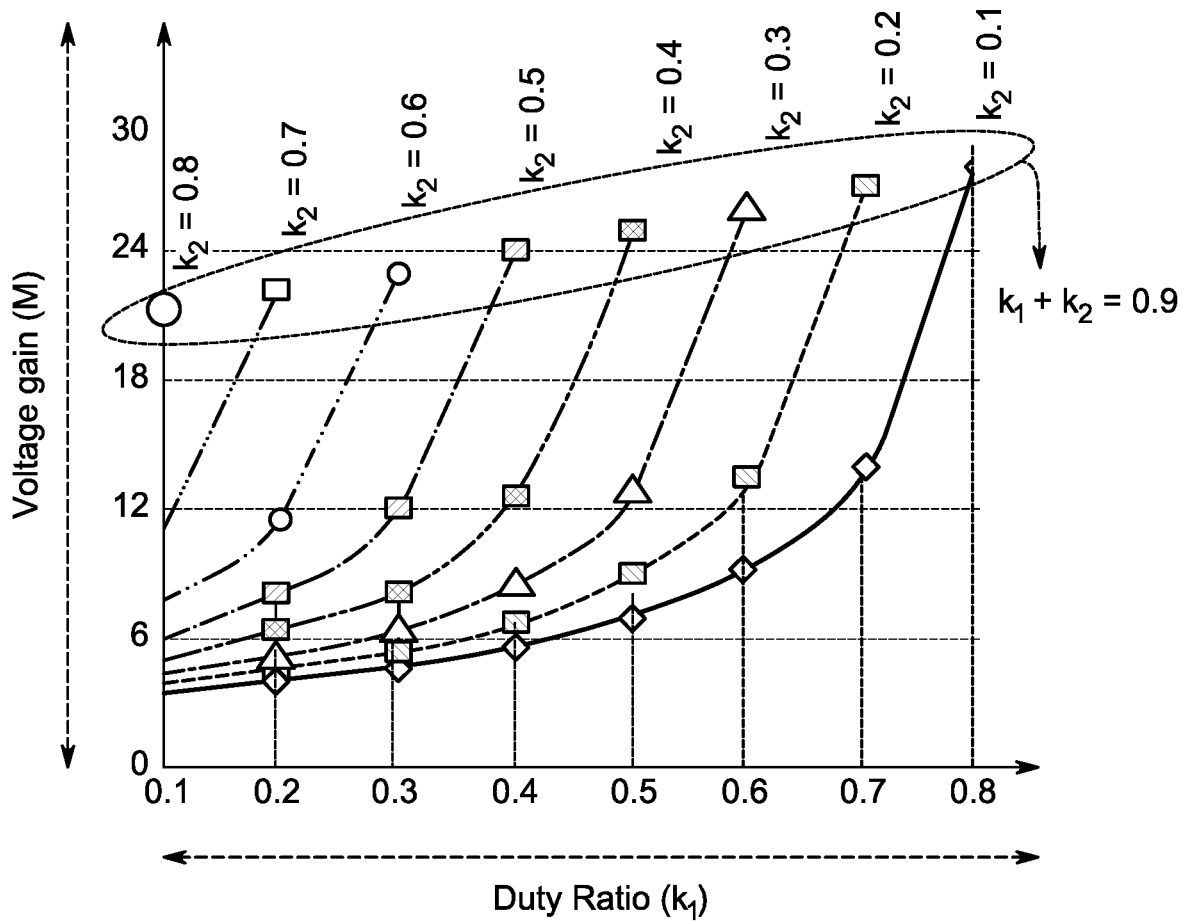
FIG. 10B is a graph illustrating voltage gains (M) estimated as a function of the duty ratio $k_1$ with the duty ration $k_2$ as a parameter for a PLL-HG converter under certain embodiments of the present disclosures for n=2.
Figure 10C:
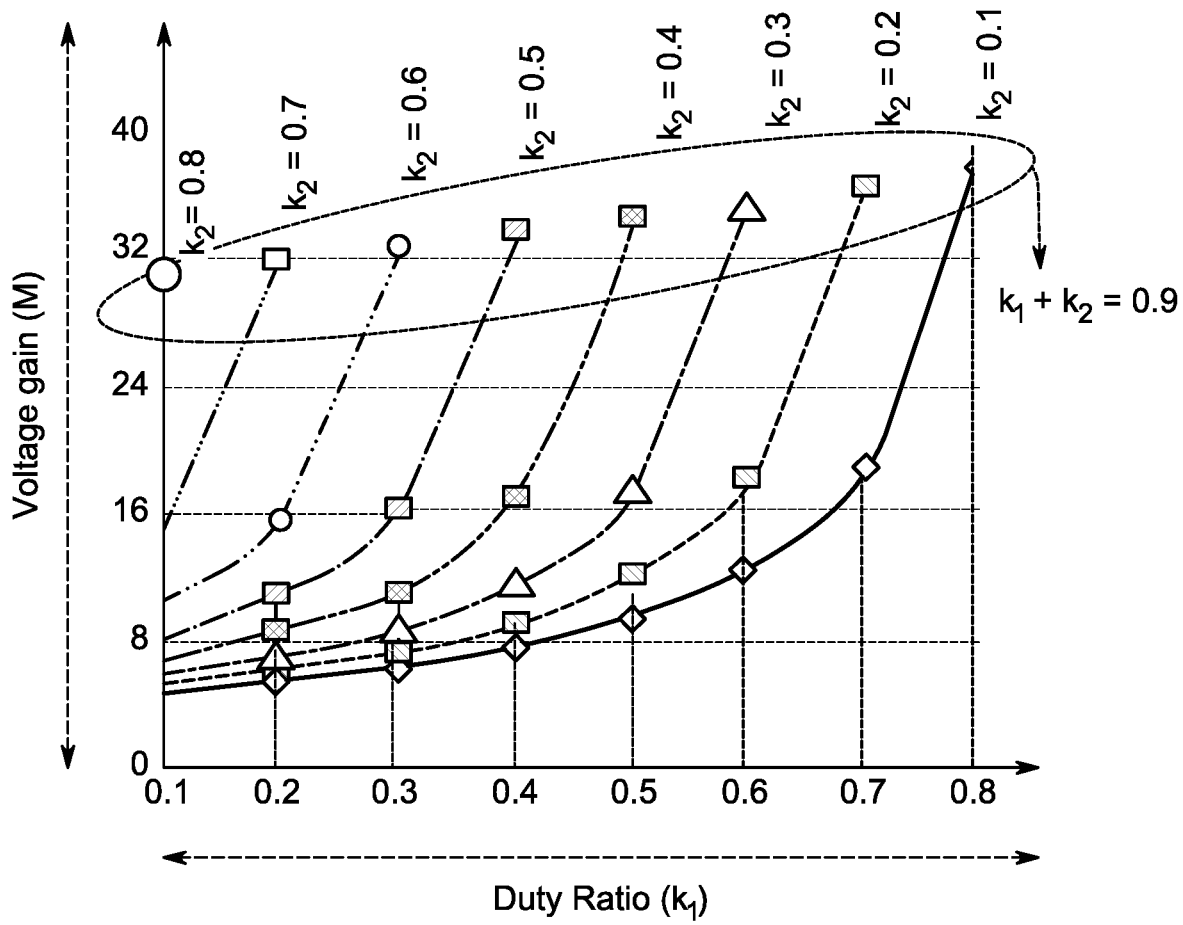
FIG. 10C is a graph illustrating voltage gains (M) estimated as a function of the duty ratio $k_1$ with the duty ration $k_2$ as a parameter for a PLL-HG converter under certain embodiments of the present disclosures for n=3.

FIG. 10 is a graph illustrating voltage gains (M) estimated as a function of the duty ratio $k_1$ with the duty ration $k_2$ as a parameter for a PLL-HG converter under certain embodiments of the present disclosures. Here FIGS. 10 A, B and C each corresponds to results for the PLL-HG converters with the plurality number n of the PLL, n=1, 2 and 3, respectively. A comparison of voltage gains at a same combination of ($k_1$, $k_2$) among Figures A, B and C, (see for example, those within dotted ellipses) demonstrates that the voltage gain increases when the plurality number n of the PLL increases.

On the other hand, depending on applications, lower slope areas in FIG. 10 may be preferable from stand point of gain stability against duty cycle fluctuations. FIG. 10 indicates that areas having a sum value of ($k_1+k_2$) not greater than certain values e.g., 0.8 or 0.7 are preferable from such point of view.

C. Efficiency Analysis of PLL-HG Converter

Figure 11:
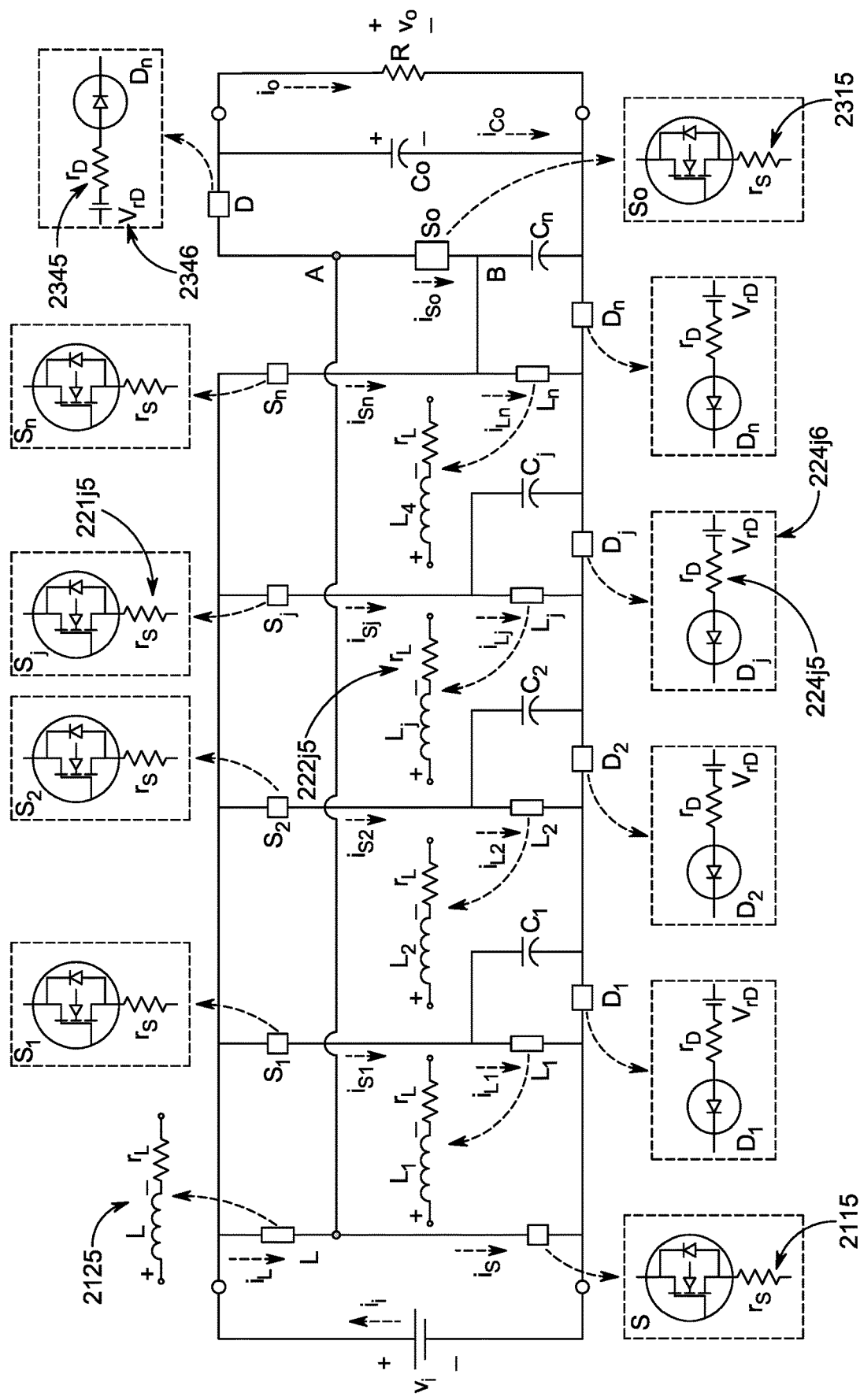
FIG. 11 illustrates non-ideality factors taken into account in the circuitry for the PLL-HG converter in certain embodiments illustrated in FIG. 2.

FIG. 11 illustrates non-ideality factors which are taken into account in the circuit for the PLL-HG converter in certain embodiments illustrated in FIG. 2. The non-idealities of the switches, the active input switch S, the active leg switches $S_1, S_2, \ldots, S_n$, and the active output switch $S_o$ are taken into account by ON state resistance $r_s$ 2115, 221j5, 2315 in series with each of the switches. The non-idealities of the input inductors L and the leg inductors $L_1, L_2, \ldots, L_n$ are taken into account by resistance $r_L$ 2125, and 222j5 in series with each of the inductors. The non-ideality of the leg diodes $D_1, D_2, D_3, \ldots, D_n$, and the output diode D is taken into account by their forward resistance $r_D$ 224j5, 2345 and threshold voltage $V_{rD}$ 224j6, 2346. It is noteworthy that the non-ideality of the output switch diode $D_o$ is neglected for simplicity. Also, it is assumed that i) all the capacitors are large enough and have zero voltage ripples, ii) a voltage drop across each inductor due to $r_L$ is $V_{rL}$, iii) a voltage drop across each switch due to $r_s$ is $V_{rS}$, and iv) a total voltage drop across each diode due to $r_D$ and threshold voltage is $V_{rD}$.

1) State-I [$t_0$-$t_1$]

The average voltage and current across/through the inductors L, $L_1, L_2, \ldots, L_n$ can be derived as, $$V_L \approx V_i - V_{rL} - V_{rS}, \\ V_{L1} \approx V_i - V_{rL} - V_{rS} \\ V_{L2} \approx V_i - V_{rL} - V_{rS} - V_{rD} \\ \vdots \\ V_{Ln} \approx V_i - V_{rL} - V_{rS} - (n-1)V_{rD} \\ I_L = I_i - I_{L1} - I_{L2} - \cdots - I_{Ln} \quad (38)$$

The average voltage and current across/through capacitor $C_o$ are obtained as, $$V_{Co} = V_o, I_{Co} = -I_o \approx -\frac{V_o}{R} \quad (39)$$

2) State-II [$t_1$-$t_2$]

The average voltage and current across/through the inductors L, $L_1, L_2, \ldots, L_n$ can be derived as, $$V_L + V_{L1} + \cdots + V_{Ln} = V_i - (n+1)V_{rL} + V_{C1} + V_{C2} + \cdots + V_{C(n-1)} - V_{rS} \\ V_L = V_{L1} = \cdots = V_{Ln} = \frac{nV_i - (n+1)V_{rL} - V_{rS}}{n+1} \\ I_i = I_L = I_{L1} = \cdots = I_{Ln} = I_{So} \quad (40)$$

The average voltage and current across/through capacitor $C_o$ are obtained as, $$V_{Co} = V_o, I_{Co} \approx -\frac{V_o}{R} \quad (41)$$

3) State-III [$t_2$-$t_3$]

The average voltage and current across/through the inductors L, $L_1, L_2, \ldots, L_n$ can be derived as, $$V_L + V_{L1} + \cdots + V_{Ln} = V_i - (n+1)V_{rL} + V_{C1} + \cdots + V_{Cn} - V_{rD} - V_o \\ V_L = V_{L1} = \cdots = V_{Ln} = \frac{(n+1)V_i - (n+1)V_{rL} - V_{rD} - V_o}{n+1} \\ I_i = I_L = I_{L1} = \cdots = I_o = I_{Co} \quad (42)$$

The average voltage and current across/through capacitor $C_o$ are obtained as, $$V_{Co} = V_o; I_{Co} \approx I_L - \frac{V_o}{R} \quad (43)$$

By applying capacitor charge balanced principle on $C_o$, $$\Delta Q(T) = \int_0^T \frac{dQ}{dt} dt = \int_0^T i_{C_o}(t) dt = 0, \quad (44)$$

$$\int_0^{k_1 T} i_{C_o}(I) dt + \int_{k_1 T}^{(k_1+k_2)T} i_{C_o}(II) dt + \int_{(k_1+k_2)T}^T i_{C_o}(III) dt = 0. \quad (45)$$

Inserting Equations (39), (41) and (43) for $i_{C_o}(I)$, $i_{C_o}(II)$ and $i_{C_o}(III)$, respectively, $$-\frac{V_o}{R}(k_1 + k_2) + \left(I_L - \frac{V_o}{R}\right)(1 - k_1 - k_2) = 0, \quad (46)$$

Thus, the current through inductor L, $L_1, L_2, \ldots,$ and $L_n$ in the state III can be written as, $$I_L = \frac{V_o/R}{(1 - k_1 - k_2)} \quad (47)$$

By applying volt second balanced principle on the inductor L, $L_1, L_2, \ldots,$ and $L_n$, $$\int_0^T v_L dt = \int_0^T -L\frac{di_L}{dt}dt = \Delta i_L(T) = 0, \tag{48}$$

$$\int_0^{k_1 T} v_L(I)dt + \int_{k_1 T}^{(k_1+k_2)T} v_L(II)dt + \int_{(k_1+k_2)T}^{T} v_L(III)dt = 0 \tag{49}$$

Inserting Equations (38), (40) and (42) for $v_L(I)$, $v_L(II)$ and $v_L(III)$, respectively, $$(V_i - V_{rL} - V_{rS})k_1 + \frac{nV_i - (n+1)V_{rL}V_{rS}}{n+1}k_2 + \tag{50}$$
$$\frac{(n+1)V_i - (n+1)V_{rL} - V_{rD} - V_o}{n+1}(1 - k_1 - k_2) = 0,$$

$$(1 - k_1 - k_2)V_o = [(n+1) - k_2]V_i - \tag{51}$$
$$(n+1)V_{rL} - \{(n+1)k_1 + k_2\}V_{rS} - (1 - k_1 - k_2)V_{rD},$$

$$V_o = \frac{V_i}{(1-k_1-k_2)}\left\{[(n+1)-k_2] - \tag{52}\right.$$
$$\left.(n+1)\frac{V_{rL}}{V_i} - [(n+1)k_1 + k_2]\frac{V_{rS}}{V_i} - (1-k_1-k_2)\frac{V_{rD}}{V_i}\right\}.$$

Thus, the output voltage and the voltage gain are derived as, $$V_o = \tag{53}$$
$$\frac{(n+1) - k_2 - \frac{AV_{rL}}{V_i} - \frac{BV_{rS}}{V_i} - \frac{CV_{rD}}{V_i}}{1 - k_1 - k_2} \times V_i = \frac{(n+1) - k_2 - \gamma_{vd}}{1 - k_1 - k_2} \times V_i,$$

$$M \equiv \frac{V_o}{V_i} = \tag{54}$$
$$\frac{(n+1) - k_2 - \frac{AV_{rL}}{V_i} - \frac{BV_{rS}}{V_i} - \frac{CV_{rD}}{V_i}}{1 - k_1 - k_2} = \frac{(n+1) - k_2 - \gamma_{vd}}{1 - k_1 - k_2},$$

where, $$\gamma_{vd} \equiv \frac{AV_{rL}}{V_i} + \frac{BV_{rS}}{V_i} + \frac{CV_{rD}}{V_i} \tag{55}$$

$$A \equiv (1+n), \tag{56}$$
$$B \equiv \{(n+1)k_1 + k_2\},$$
$$C \equiv 1 - k_1 - k_2.$$

Here, a non-ideality factor $\gamma_{vd}$ represents contributions of voltage drops $V_{rL}$, $V_{rS}$ and $V_{rd}$ to the output voltage drop or deterioration of the voltage gain M, where A gives a contribution coefficient for $V_{rL}$ of the inductors and indicates it is proportional to a total number of the inductors, B gives a contribution coefficient for $V_{rS}$ of the switches and indicates that (n+1) switches contribute for $k_1$ period and one switch for $k_2$ period, namely they contribute while they are ON states, C gives a contribution coefficient for $V_{rD}$ of the diodes, and it indicates the output diode only contribute to the deterioration for $(1-k_1-k_2)$ period.

The total switching power loss of switches S, $S_o$, $S_1$ to $S_n$ can be obtained as follows, $$P_{S,total}^{Loss} = P_S^{Loss} + \Sigma_{i=1}^{n}P_{Si}^{Loss} + P_{So}^{Loss} \tag{57}$$

The total switching power loss in terms of rising ($R_t$) and falling ($F_t$) switching time of switches can be obtained as, $$P_{S,total}^{Loss} = \left[\frac{V_{So}I_{So}(R_{t,so} + F_{t,so})}{T} + \frac{V_{S1}I_{S1}(R_{t,s1} + F_{t,s1})}{T} + \right. \tag{58}$$
$$\left. \cdots + \frac{V_{S2}I_{S2}(R_{t,s2} + F_{t,s2})}{T} + \frac{V_S I_S(R_{t,s} + F_{t,s})}{T}\right]$$

The input and output powers can be written as follows, $$\begin{cases} P_i^{total} = V_i \left\{ \left(I_L - \sum_{i=1}^{n} I_{Li}\right)k_1 + \left(\sum_{i=1}^{n} I_{Ci}\right)k_1 + \\ \left(\frac{I_L}{n+1} + \sum_{i=1}^{n}\frac{I_{Li}}{n+1}\right)k_2 + I_L(1 - k_1 - k_2)\right\} + P_{S,total}^{Loss} \\ P_o^{total} = \frac{V_o^2}{R_o} \end{cases} \tag{59}$$

Using (53)-(59), the efficiency of the PLL-HG converter is obtained as follows, $$\eta \cong \frac{M}{\frac{1+nk_1}{1-k_1-k_2} + \frac{R}{V_o}\left(\sum_{i=1}^{n}I_{Ci}\right)k_1 + \frac{R}{V_o V_i}P_{S,total}^{Loss}} = \tag{60}$$

$$\frac{1}{\left(\frac{1}{M}\right)\frac{1+nk_1}{1-k_1-k_2} + \frac{V_i\left(\sum_{i=1}^{n}I_{Ci}\right)k_1}{\frac{V_o^2}{R}} + \frac{P_{S,total}^{Loss}}{\frac{V_o^2}{R}}}.$$

Using Equation (54) for the voltage gain M, $$\eta \cong \frac{1}{\frac{1+nk_1}{(n+1) - k_2\gamma^{vd}} + \frac{V_i\left(\sum_{i=1}^{n}I_{Ci}\right)k_1}{\frac{V_o^2}{R}} + \frac{P_{S,total}^{Loss}}{\frac{V_o^2}{R}}} \tag{61}$$

As observed in Equation (61), the efficiency increases when the non-ideality factor $\gamma_{vd}$ decreases and also when a ratio of the switching loss against the output power decreases.

Design of PLL-HG Converter

The PLL-HG converter can be designed by considering the parameters including an input voltage $V_i$, an output power $P_o$ with an output voltage $V_o$, time period T for switching the gates, and a load R.

The duty cycle for the design is calculated as follows, $$\left.\begin{array}{l}M_{CCM} = \frac{V_o}{V_i} = \frac{(n+1)-k_2}{1-k_1-k_2} = \frac{1}{1-K_{PLL-HG}(k_1,k_2)} \\ K_{PLL-HG}(k_1, k_2) = (n+k_1)/[(n+1)-k_2]\end{array}\right\} \tag{62}$$

For better performance, the duty parameter can be designed by considering the worst efficiency $\eta_{worst}$. The required duty cycle to achieve the voltage gain $M_{CCM}$ at the worst efficiency can be obtained as, $$K_{PLL-HG}(k_1, k_2) = 1 - \frac{\eta_{worst}}{M_{CCM}} \tag{63}$$

The critical (minimum) inductance $L_C$ is determined from a requirement to suppress a current ripple through the inductor which may be caused by a charging pulse with the voltage V and the width $(k_1+k_2)T$. It is estimated using a relation giving a voltage across an inductor $$v_L = L\frac{di_L}{dt}$$

as follows;

$$L_c = \frac{\left(k_1 + k_2\frac{n}{n+1}\right)V_i}{f \times \Delta i_L} = \frac{\left(k_1 + k_2\frac{n}{n+1}\right)V_i}{f \times (0.3I_L)} \quad (64)$$

where, a ripple of inductor current $\Delta i_L$ has been assumed to be 30% of the average inductor current $I_L$. The average inductor current $I_L$ can be estimated by using Equations (47). The current rating $I_{LR}$ can be estimated as follows by assuming 50% of maximum ripple.

$$I_{LR} > I_L + 0.5\Delta i_L \quad (65)$$

The critical minimum capacitances of the capacitors are determined from a requirement to suppress a voltage change across the capacitors within a certain amount $\Delta V_C$ and estimated using a relation giving a current through an capacitor;

$$i_C = C\frac{dv_C}{dt}.$$

For the leg capacitors $C_1, C_2 \ldots C_n$, the maximum voltage ripple $\Delta V_C$ may be caused by the discharging current $I_{C,dis}$ during the period $(1-k_1)T$. Thus, the critical (minimum) capacitances are given by;

$$C_{1c} = C_{2c} = \ldots = C_{nc} = \frac{(1-k_1)I_{C,dis}}{f \times \Delta V_C} \quad (66)$$

where, the discharging current $I_{C,dis}$ can be estimated using Equations (10) and (16), while $\Delta V_C$ can be determined by a design specification, for example chosen to be, $0.1 V_i$. The voltage rating can be determined as follows, $$V_{C1R} = V_{C2R} = \ldots = V_{CnR} \geq V_i \quad (67)$$

On the other hand, for the output capacitor $C_o$, a critical (minimum) capacitance is determined by a discharging current required to supply to the load R during the first and the second duty cycle period, i.e. for a time period of $(k_1+k_2)T$. Thus, assuming voltage ripple $\Delta V_{Co}$ of 1% of the output voltage $V_o$, the critical minimum capacitance $C_{oC}$ of the output capacitor is determined as;

$$C_{oc} = \frac{(k_1+k_2)V_o}{f\Delta V_{Co}R} = \frac{(k_1+k_2)V_o}{Rf \times 0.01V_o} \quad (68)$$

The voltage rating $V_{CoR}$ for the output capacitor $C_o$ can be estimated as follows, $$V_{CoR} \geq V_o \quad (69)$$

A voltage rating $V_{SjR}$ for the switches $S_1, S_2, \ldots$, and $S_n$ in the PLL and a voltage rating $V_{SoR}$ for the active output switch $S_o$ can be decided using Table I and Equation (19) on the voltage gain, as follows;

$$V_{SjR} = V_{S1R} = \ldots = V_{SnR} > \frac{j \times V_i}{n+1}\left(\frac{(n+1)-k_2}{1-k_1-k_2}\right) \quad (70)$$

$$V_{SoR} > (V_o - V_i) = V_i\left(\frac{n+k_1}{1-k_1-k_2}\right). \quad (71)$$

Voltage ratings for the diodes can be decided similarly using Table I. A voltage rating $V_{DjR}$ for the leg diodes $D_1, D_2, \ldots, D_n$ can be decided as;

$$V_{DjR} = V_{D1R} = \ldots = V_{D1R} > \frac{V_i}{n+1}\left(\frac{(n+1)-k_2}{1-k_1-k_2}\right). \quad (72)$$

A voltage rating $V_{DR}$ for the output diode D can be decided as;

$$V_{DR} > V_o = V_i\left(\frac{(n+1)-k_2}{1-k_1-k_2}\right) \quad (74)$$

A voltage rating $V_{DoR}$ for the output switch diode $D_o$ can be decided as;

$$V_{DoR} > V_i \quad (75)$$

E. Comparison of Converters

Table II compares configurations of DC-DC converters presented in the literatures with the PLL-HG converter certain embodiments of the present disclosure. The converters presented in the references A, B, C are the extension of classical boost converters and designed by adding one additional leg with voltage lift and active switched inductor techniques. The PLL-HG converter according to certain embodiments of the present disclosure and the converter in the reference C have the feature of multi-leg structure and possible to select a number of leg(s) as per the requirements. However, the converter of the reference C requires five diodes and two inductors, total seven components per an additional leg. Whereas, the PLL-HG converter according to certain embodiments requires one diode, one inductor and one capacitor, total three components per an additional leg. The PLL-HG converter requires lesser numbers of reactive components and semiconductor devices than those required in reported converters, which naturally leads to a lower cost and a higher reliability.

TABLE II

COMPARISON OF PLL-HG CONVERTER WITH CLASSICAL AND RECENTLY PROPOSED CONVERTERS

| Parameter | Classical Boost Converter | Ref. A I | Ref. A II | Ref. A III | Ref. B | Ref. C | Proposed converter |
|---|---|---|---|---|---|---|---|
| Number of switches | 1 | 2 | 2 | 2 | 3 | $n + 2$ (1 switch per leg) | $n + 2$ (1 switch per leg) |
| Number of inductors | 1 | 2 | 2 | 2 | 2 | $2n + 4$ (2 inductors per leg) | $n + 1$ (1 inductor per leg) |
| Number of capacitor | 1 | 1 | 2 | 3 | 1 | 1 | $n + 1$ (1 switch per leg) |
| Number of diodes | 1 | 1 | 2 | 3 | 2 | $5n + 6$ (5 diodes per leg) | $n + 2$ (1 diode per leg) |
| Voltage gain, M | $\dfrac{1}{1-k}$ | $\dfrac{1+k}{1-k}$ | $\dfrac{2}{1-k}$ | $\dfrac{3-k}{1-k}$ | $\dfrac{1+k_1}{1-k_1-k_2}$ | $\dfrac{1+(2n+3)k}{1-k}$ | $\dfrac{(n+1)-k_2}{1-k_1-k_2}$ |
| Normalized voltage stress of the switch | 1 | $\dfrac{M-1}{2M}$ | $\dfrac{1}{2}$ | $\dfrac{M-1}{2M}$ | $V_{S1} = \dfrac{M+1}{2M}$, $V_{S2} = 1$ | $\dfrac{n+1+M}{(n+2)M}$ | $V_S = \dfrac{1}{n+1}$, $V_{Sj} = \dfrac{j}{n+1}$ $V_{S0} = (M-1)/M$ |
| Normalized PIV of intemediate diodes | — | — | $-\dfrac{1}{2}$ | $\dfrac{M-1}{2M}$ | $-1/M$ | $V_{D1,D4} = 1/M$, $V_{D2} = 2V_{D3}$ $V_{D2,D5} = \dfrac{-(M-1)}{(2n+4)M}$ | $V_{D1,\ldots,Dn} = \dfrac{1}{n+1}$ |
| Normalized PIV of load side diodes | $-1$ | $\dfrac{M-1}{2M}$ | $-1$ | $\dfrac{1-M}{M}$ | $\dfrac{-(1+M)}{M}$ | $\dfrac{-(1+M)}{M}$ | $-1$ |
| Wide range of duty cycle | No | No | No | No | Yes | No | Yes |

References A-C for the Table II.
A: L. Yang., T. Liang and J. Chen, Id.
B: M. Lakshmi and S. Hemamalini Id.
C: E. Babaei. H. M. Mataeri. M. Sabahi and S. H. Hosseini. Id.

The voltage gain of the PLL-HG converter can be set higher than those of classical converters and converters presented in References A to B. For example, a choice of $k_1 = k = 0.6$, $k_2 = 0.2$ gives the voltage gain M of 2.5 for the classical boost converter, 4 to 6 for Reference A, 8 for Reference B, 19 for Reference C with n=4, 24 for PLL-HG with n=4.

It is noteworthy that the voltage gain of PLL-HG converter and the converter in Reference B can both be controlled by two different duty cycles. The two different duty cycles enable not only operations at a wide range of duty cycles but also flexible control methods not available in other single duty cycle converters. For example, by adjusting the two duty cycles, a balanced condition realizing high voltage gain with stability against duty cycle fluctuation can be realized as described in FIG. 10. However, the converter in Reference B and PLL-HG converter differs not only in the voltage gain, but also in the voltage stress against the switches. The voltage stresses against the switches in the input circuit and in PLL are particularly low in PLL-HG converter, when compared with the other converters with two duty cycles in Reference B. In Reference B, the voltage stress normalized by the output voltage ranges from 0.5 to 1, assuming M of larger than five. On the other hand, in the PLL-HG, the voltage stress of switch of input port and $PLL_j$ (j=1, 2, 3 . . . , n) is inversely proportional to (n+1) where n giving the number of leg(s) and directly proportional to j, and ranges from 0.15 to 0.83 when n=5. This feature of low voltage stress to the switches is beneficial in realizing the PLL-HG converter with low cost and high reliability.

The PIV rating of the intermediate diodes in PLL-HG converter is inversely proportional to a sum of the number of leg(s) n and one (1), and much smaller than those of Reference A. The PIV of the output (load side) diode in PLL-HG converter is equal to the output voltage, while the PIV of converters B and C are larger than the output voltage.

Based on above comparisons, the proposed PLL-HG configuration is expected to be a promising solution to achieve higher voltage gain with flexible and wide range of two duty cycles.

F. Computer Simulations

Computer simulations were performed for the PLL-HG converters with n=1 and n=2, in order to validate theoretical analysis and operation of the PLL-HG converters according to certain embodiments of the present disclosure. The design parameters used in the computer simulations are given in Table III.

TABLE III

PARAMETERS OF PLL-HG CONVERTERS USED IN COMPUTER SIMULATIONS

| Parameters | Value for n = 1 | Value for n = 2 |
|---|---|---|
| Input voltage | 36 V-40 V | 20-24 |
| Output voltage | 400 V | 400 V |
| Power and Load | 500 W, 320 Ω | 500 W, 320 Ω |
| Switching frequency | 50 kHz | 50 kHz |
| Inductor L, $L_1$ (and $L_2$ for n = 2) | 500 µH | 500 µH |

TABLE III-continued

PARAMETERS OF PLL-HG CONVERTERS
USED IN COMPUTER SIMULATIONS

| Parameters | Value for n = 1 | Value for n = 2 |
|---|---|---|
| Intermediate capacitor $C_1$ (and $C_2$ for n = 2) | 100 μF (50 V) | 100 μF (50 V) |
| Load side capacitor $C_o$ | 100 μF (450 V) | 100 μF (450 V) |

PLL-HG Converter with n=1

FIG. 12 illustrates exemplary graphs of waveforms, namely patterns of currents and voltages observed in the computer simulations for the PLL-HG converter under certain embodiments of the present disclosure with one leg (n=1) and operated at $k_1$=50% and $k_2$=35%. The waveforms observed clearly demonstrate that the PLL-HG converter operates in three states as predicted.

Figure 12A:
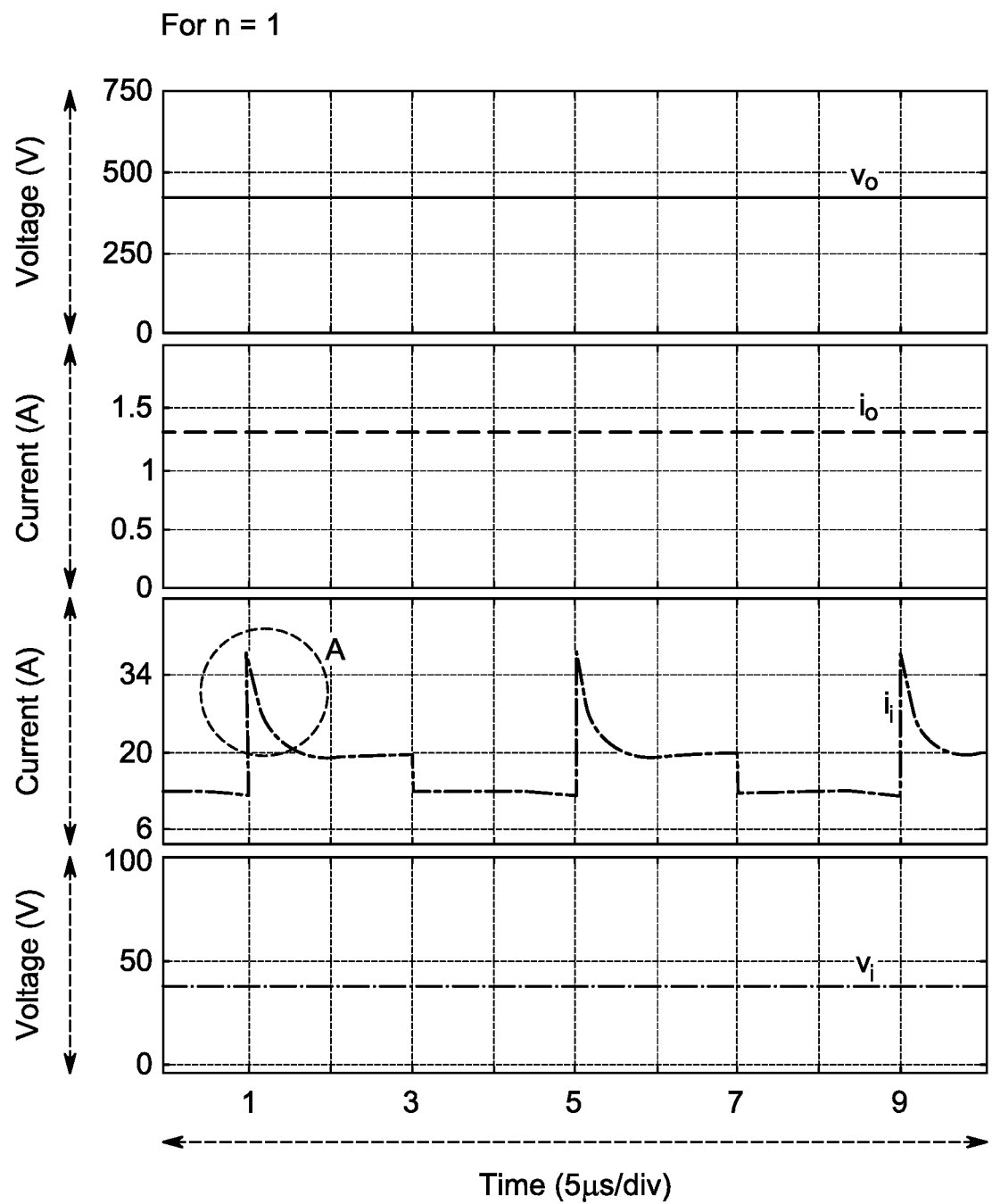
FIG. 12A-F illustrate exemplary graphs of waveforms, namely patterns of currents and voltages observed in the computer simulations for the PLL-HG converter under certain embodiments of the present disclosure with one leg (n=1) and operated at $k_1$=50% and $k_2$=35%, where FIG. 12A exemplary illustrates observed waveforms of the input voltage $v_i$, the output voltage $v_o$, the input current $i_i$ and the output current $i_o$, FIG. 12B exemplary illustrates observed waveforms of currents $i_L$ and $i_{L1}$ through the input inductor L and the leg inductor $L_1$, respectively, with the output voltage $v_o$ and the input current $i_i$, FIG. 12C exemplary illustrates observed waveforms of the output voltage $v_o$, currents $i_L$ and $i_{L1}$ through inductors L and $L_1$, respectively, and the input voltage $v_i$, FIG. 12D exemplary illustrates observed voltage waveforms of the leg capacitor $C_1$ and the output capacitor $C_o$ along with current waveforms of the inductors L and $L_1$, FIG. 12E exemplary illustrates observed waveforms of voltages across the leg diode $D_1$ and the output diode D along with the input current $i_i$ and the output voltage $v_o$.

FIG. 12A exemplary illustrates observed waveforms of the input voltage $v_i$, the output voltage $v_o$, the input current $i_i$ and the output current $i_o$. As confirmed from FIG. 12A, the output voltage $V_o$=400.67V is achieved by providing the input voltage $V_i$=38V. Namely the voltage gain M=10.54 is achieved, which agrees approximately with a theoretical prediction M=11 estimated from Equation (19). It is also confirmed that continuous output current $I_o$=1.23 A with small ripples flow through the load to provide 500 W power. It is noted that at starting of the state I, peak transient current (circled by dotted line with mark A) flows to charge the leg capacitor $C_1$.

Figure 12B:
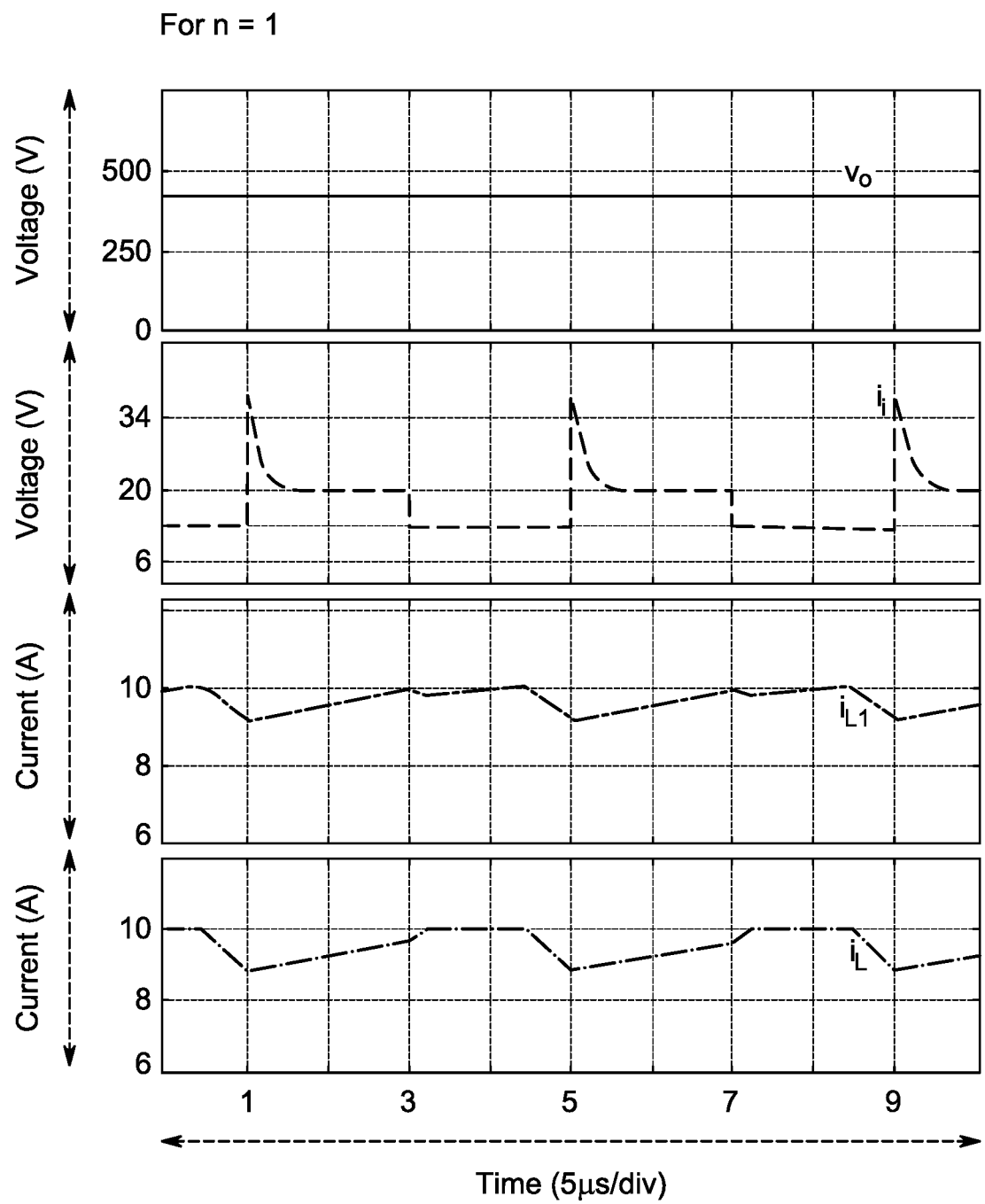

FIG. 12B exemplary illustrates observed waveforms of currents $i_L$ and $i_{L1}$ through the input inductor L and the leg inductor $L_1$, respectively, with the output voltage $v_o$ and the input current $i_i$. It is confirmed that the currents flow through the two inductors as predicted. The average value of the currents $I_L$ and $I_{L1}$ through the inductors L and $L_1$ are 9.18 A and 9.21 A, respectively. They are approximately equal as predicted. It is also confirmed that both of the inductors are charged in the states I and II, while discharged in the state III with approximately equal currents. It is worth to mention that the two inductors L and $L_1$ are charged with approximately equal charging angles in state I and II (i.e $\alpha^I_L = \alpha^I_{L1}$ and $\alpha^{II}_L = \alpha^{II}_{L1}$). Also, in state III, it is clearly visible that the two inductors are discharged with approximately equal discharging angle. It is also confirmed that the input current $i_i$ is equal to the currents $i_L$ and $i_{L1}$ through the inductors in the states II and III.

Figure 12C:
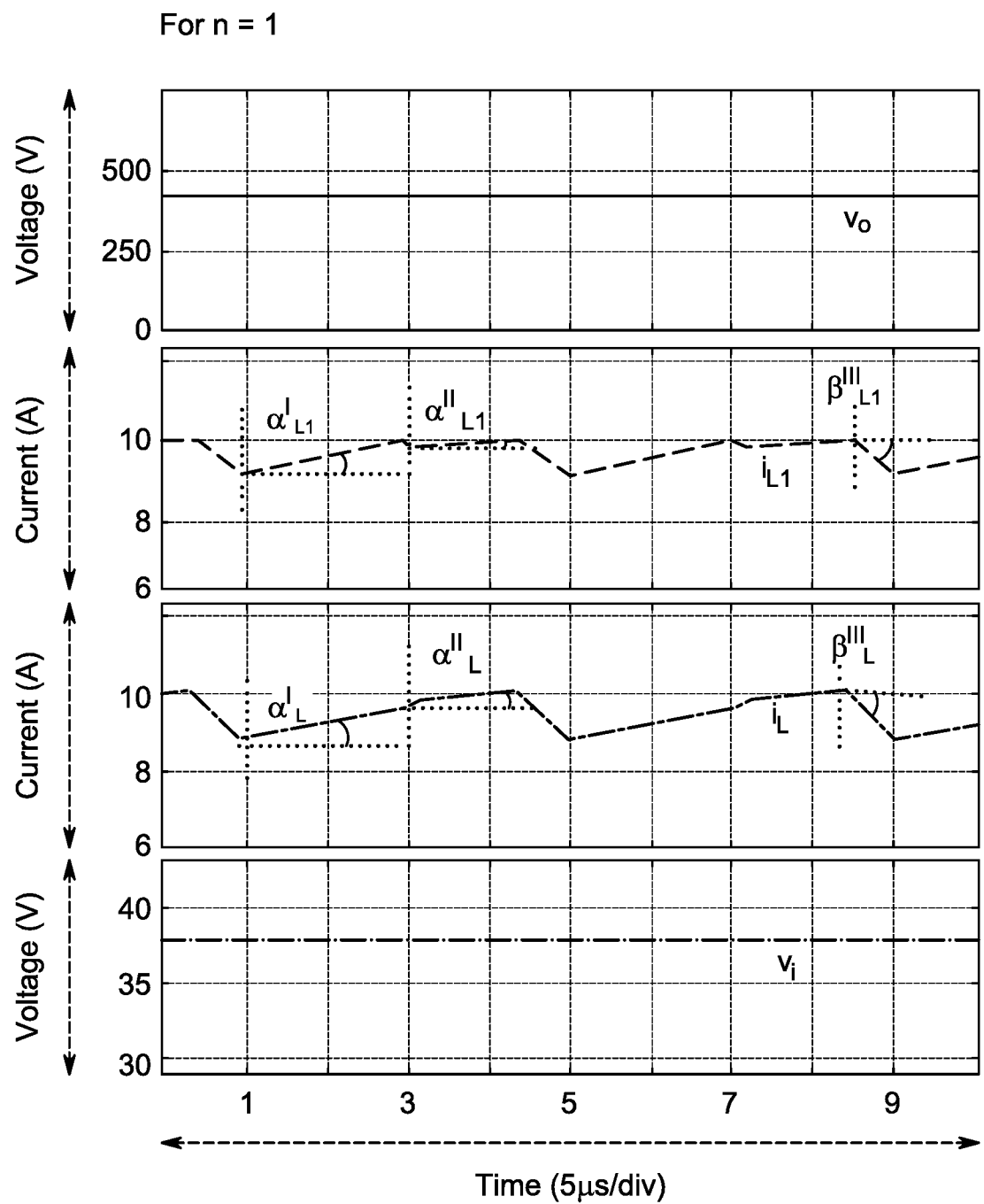

FIG. 12C exemplary illustrates observed waveforms of the output voltage $v_o$, currents $i_L$ and $i_{L1}$ through inductors L and $L_1$, respectively, and the input voltage $v_i$. It is clearly confirmed that the slope of the inductor currents is smaller in state II that that of in state I, in spite of maintaining a same amount of the input voltage. This change in the slope corresponds to the changing connection from parallel in the state I to series in the state II. Also, for both of the inductors L and $L_1$, it is confirmed that charging angles in state II are approximately half of those in state I, which is in agreement with prediction of Equations (5) and (11).

Figure 12D:
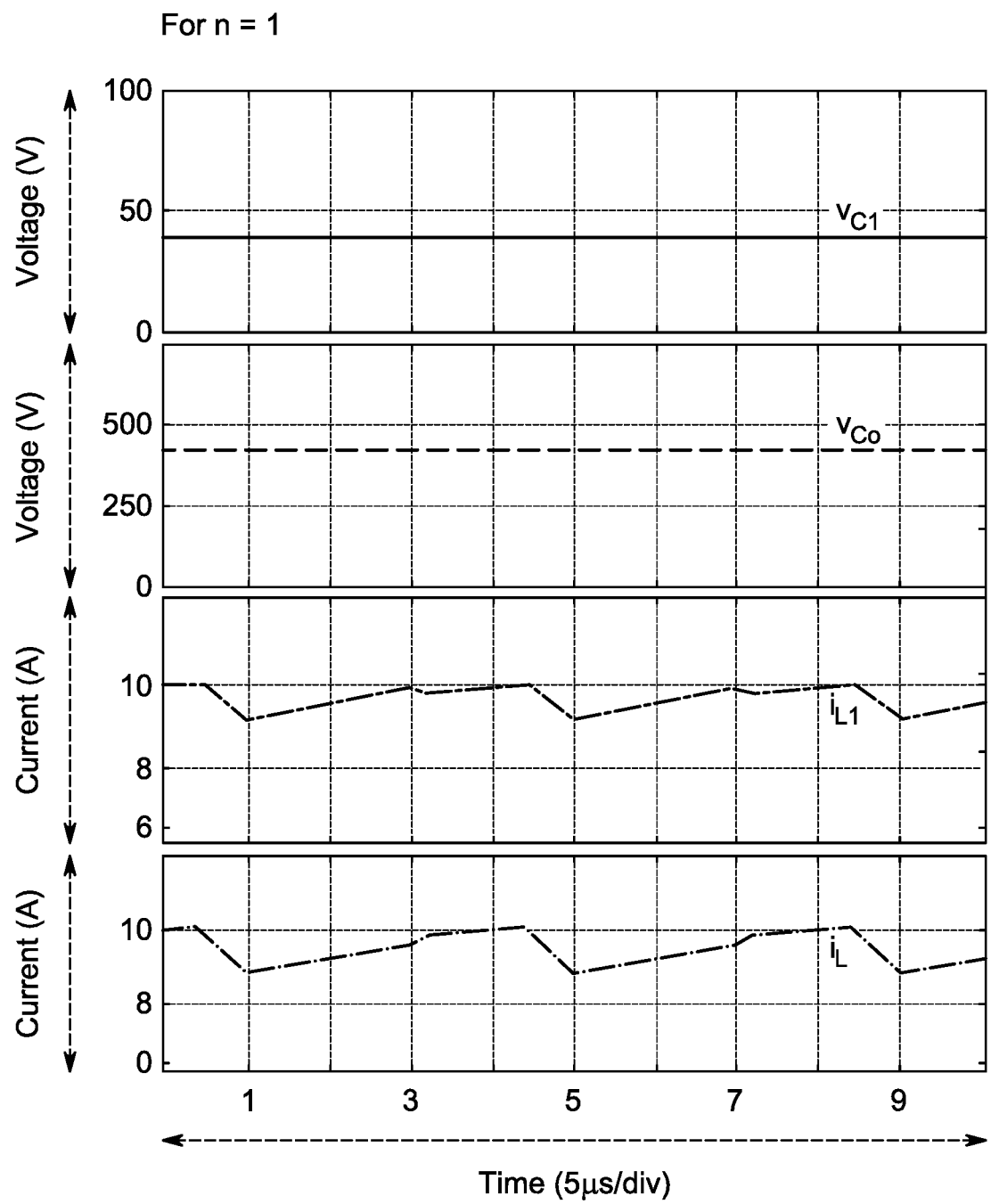

FIG. 12D exemplary illustrates observed voltage waveforms of the leg capacitor $C_1$ and the output capacitor $C_o$ along with current waveforms of the inductors L and $L_1$. It is confirmed that the average voltage $V_{C1}$ across the leg capacitors $C_1$ and the average voltage $V_{Co}$ across the output capacitor $C_o$ are 37.9V and 400.7V, respectively are approximately equal to the input voltage 38.5V and the output voltage 400.67 V, respectively, as expected. Moreover, it is also confirmed that there is no effect of variations of currents through those inductors on the voltages across the leg capacitor $C_1$ and across the output capacitor $C_o$.

Figure 12E:
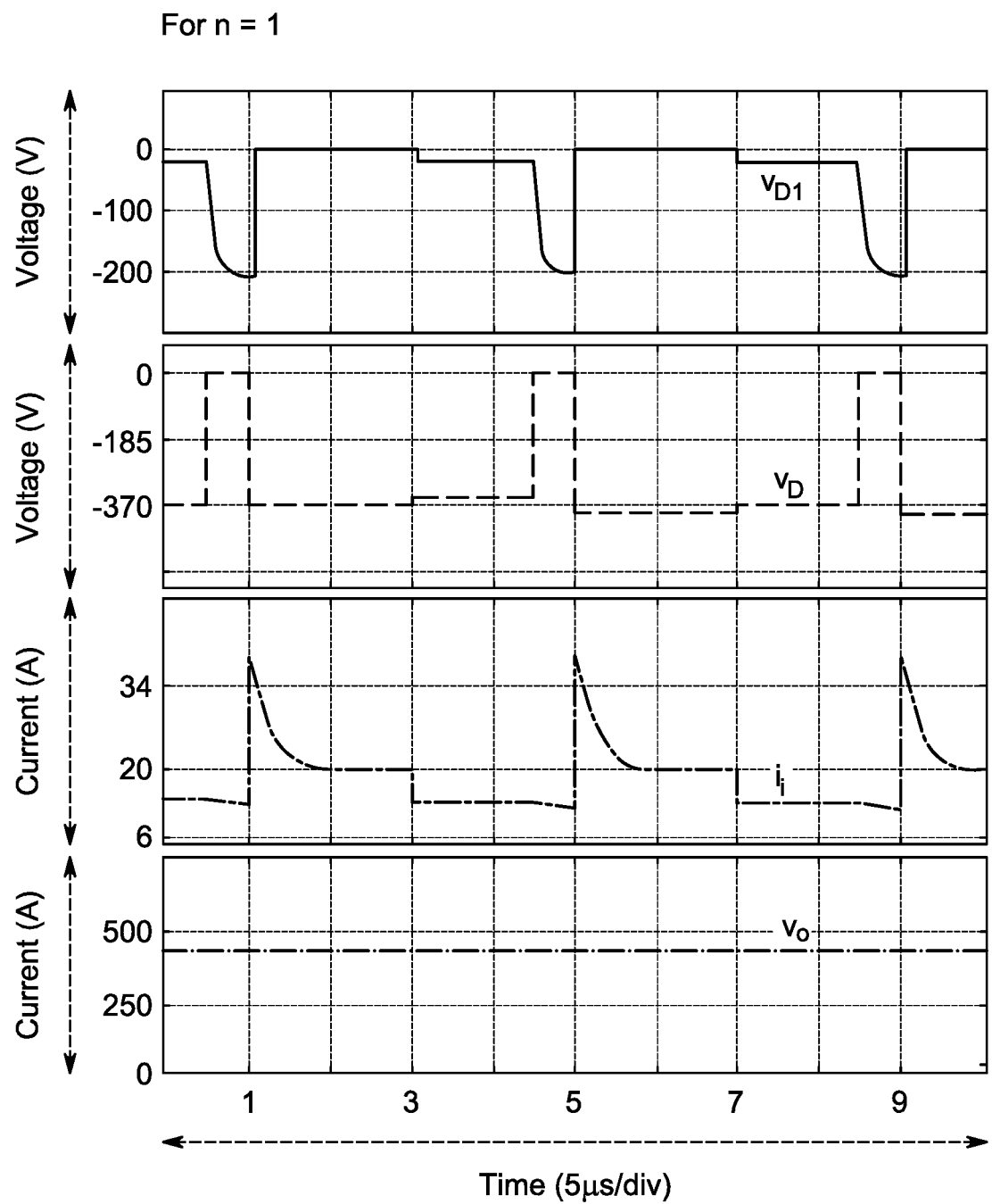

FIG. 12E exemplary illustrates observed waveforms of voltages across the leg diode $D_1$, and the output diode D along with the input current $i_i$ and the output voltage $v_o$. It was confirmed that the average voltage $V_{D1}$ across the leg diode $D_j$ and the average voltage $V_D$ across the output diode D were −38.1V and −329.3V, respectively.

Figure 12F:
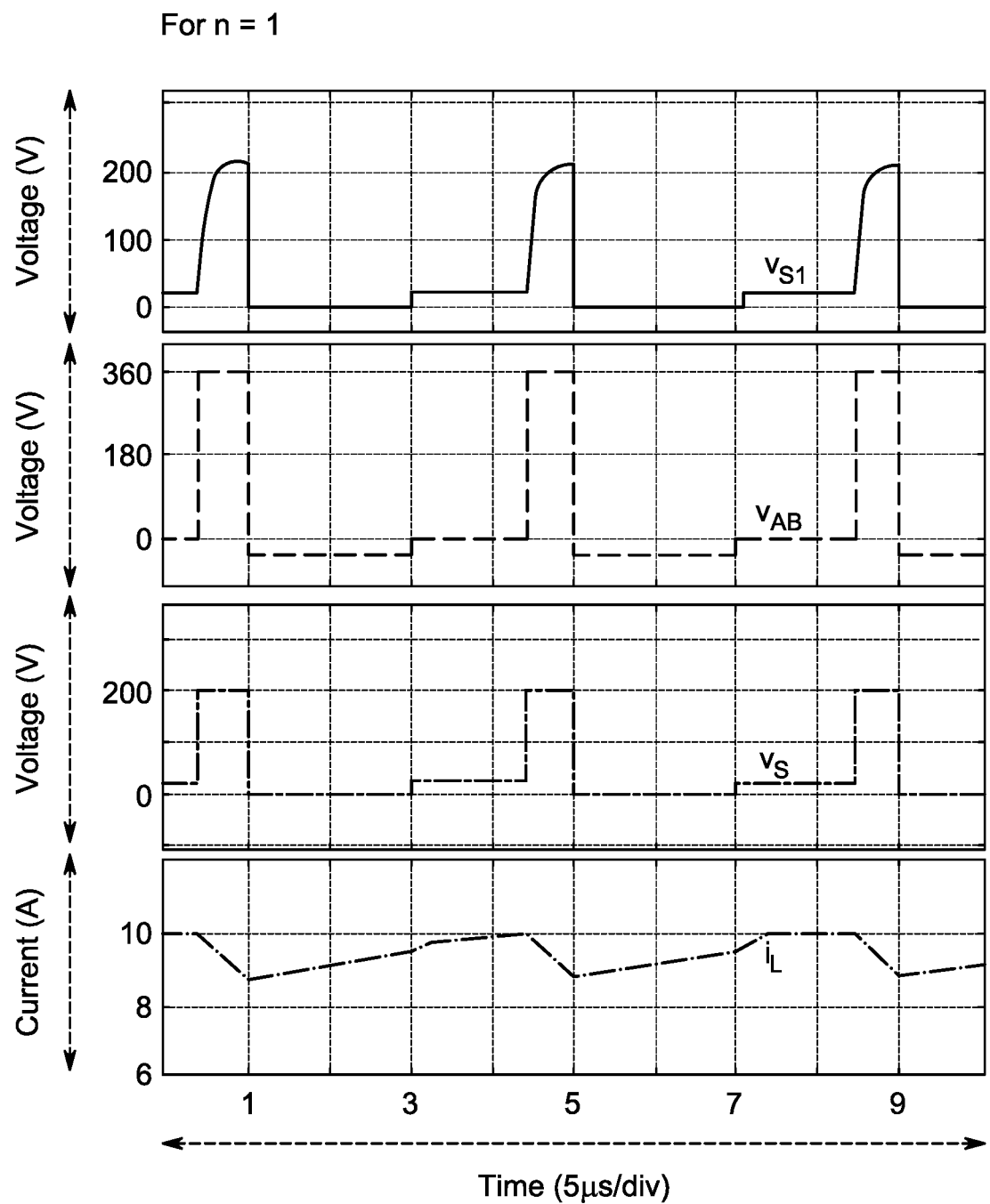

FIG. 12F illustrates observed waveforms of voltages across the active input switch S and the active leg switch $S_1$, and a voltage $V_{AB}$ between the terminals A and B, and the current $i_L$ through the input inductor L. Average voltages $V_S$ and $V_{S1}$ across the active input switch S and the active leg switch $S_1$, respectively and the voltage $V_{AB}$ were each confirmed at 38.2V, 39.39V, 38.41V, respectively. From the waveforms, it is confirmed that the active input switch S and the active leg switch $S_1$ are conducting in state I (the voltages $V_S$ and $V_{S1}$ across the switches are zero) and the active output switch $S_o$ is conducting in state II (the voltage $V_{AB}$ between the terminals A and B is zero).

PLL-HG Converter with n=2

FIG. 13 illustrates exemplary graphs of observed waveforms for the PLL-HG converter under certain embodiments of the present disclosure with two legs (n=2) and operated at $k_1$=50% and $k_2$=35%. Those observed waveforms also clearly demonstrate that the PLL-HG converter with two legs (n=2) operates in the three states of the CCM operation as predicted.

Figure 13A:
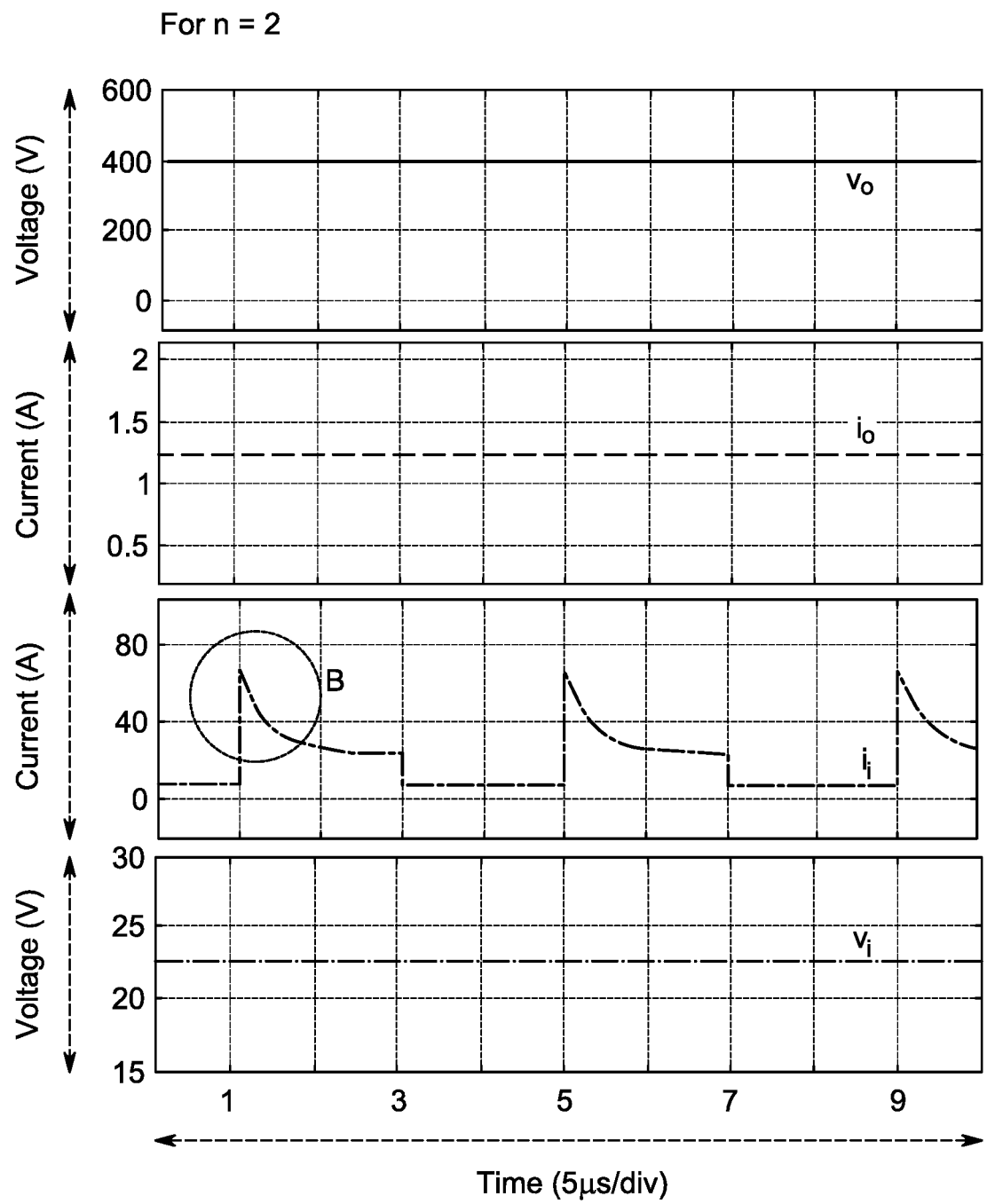
FIG. 13A-E illustrate exemplary graphs of observed waveforms for the PLL-HG converter under certain embodiments of the present disclosure with two legs (n=2) and operated at $k_1$=50% and $k_2$=35%, where FIG. 13A exemplary illustrates observed waveforms of the input voltage $v_i$, the output voltage $v_o$, the input current $i_i$ and the output current $i_o$, FIG. 13B exemplary illustrates observed waveforms of currents $i_L$, $i_{L1}$ and $i_{L2}$ through the input inductor L and the leg inductors $L_1$ and $L_2$ respectively, with the waveform of the output voltage $v_o$, FIG. 13C exemplary illustrates observed voltage waveforms of the leg capacitors $C_1$, $C_2$ and the output capacitor $C_o$ along with the input voltage waveform, FIG. 13D exemplary illustrates observed waveforms of voltages across the leg diodes $D_1$, $D_2$ and the output diode D along with the output voltage $v_o$.

FIG. 13A exemplary illustrates observed waveforms of the input voltage $v_i$, the output voltage $v_o$, the input current $i_i$ and the output current $i_o$. It was confirmed that an output voltage $V_o$=399.7V is achieved by providing an input voltage $V_i$=23V. Namely the voltage gain M=17.37 is achieved, which agrees approximately with a theoretical prediction M=17.66 estimated from Equation (19). It was also confirmed that continuous output current $I_o$=1.25 A with small ripples flows through the load to provide 500 W output power. It is noted that at starting of the state I, peak transient current (circled by dotted line with mark B) flows to charge the leg capacitor $C_1$ and $C_2$ in parallel connection.

Figure 13B:
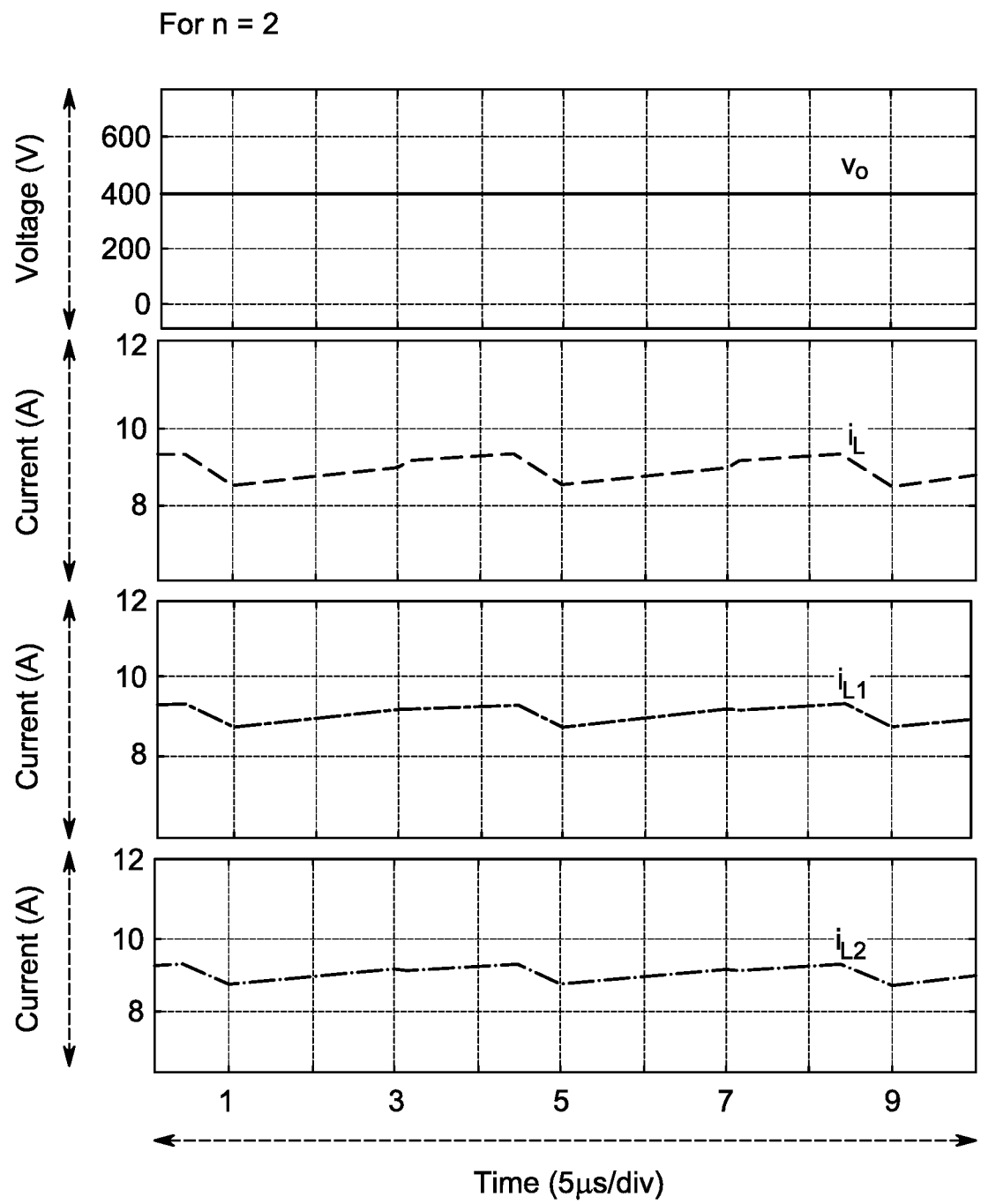

FIG. 13B exemplary illustrates observed waveforms of currents $i_L$, $i_{L1}$ and $i_{L2}$ through the input inductor L and the leg inductors $L_1$ and $L_2$ respectively, with the output voltage $v_o$. It is confirmed that the currents flow through the three inductors as predicted. The average value of the currents $I_L$, $I_{L1}$ and $i_{L2}$ through the inductors L, $L_1$ and $L_2$ are 9.15 A and 9.11 A, and 9.10 A respectively. They are approximately equal as predicted. It is also confirmed that input inductor L and the leg inductor $L_1$ and $L_2$ are charged in the states I and II, while discharged in the state III with approximately equal currents. It is worth to mention that input inductor L and the leg inductor $L_1$ and $L_2$ are charged with approximately equal charging angles in state I and II (i.e., $\alpha^I_L = \alpha^I_{L1} = \alpha^I_{L2}$ and $\alpha^{II}_L = \alpha^{II}_{L1} = \alpha^{II}_{L2}$). Also, in state III, it is clearly visible that input inductor L and the leg inductor $L_1$ and $L_2$ are discharged with approximate equal discharging angle.

Figure 13C:
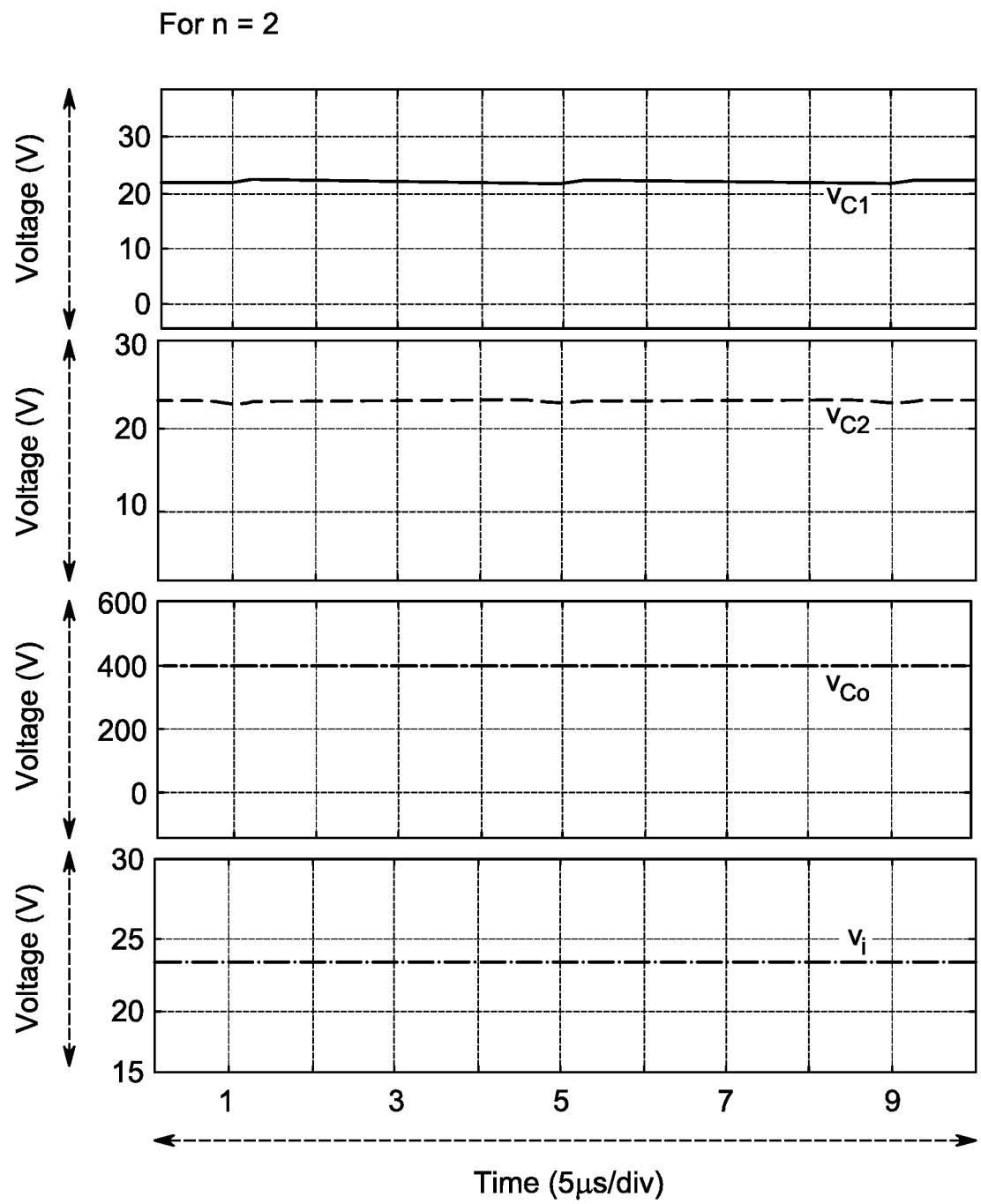

FIG. 13C exemplary illustrates observed voltage waveforms of the leg capacitors $C_1$, $C_2$ and the output capacitor $C_o$ along with the input voltage waveform. It was confirmed that the average voltage $V_{C1}$ across the leg capacitors $C_1$, the average voltage $V_{C2}$ across the leg capacitors $C_2$ and the average voltage $V_{Co}$ across the output capacitor $C_o$ were 22.8V, 22.7V and 399.9V, respectively, which are approximately equal to the input voltage 23V and the output voltage 399.7V, respectively, as theoretically predicted. Moreover, it is also confirmed that there is no effect of variations of currents through those inductors on the voltages across the leg capacitors $C_1$, $C_2$ and across the output capacitor $C_o$.

Figure 13D:
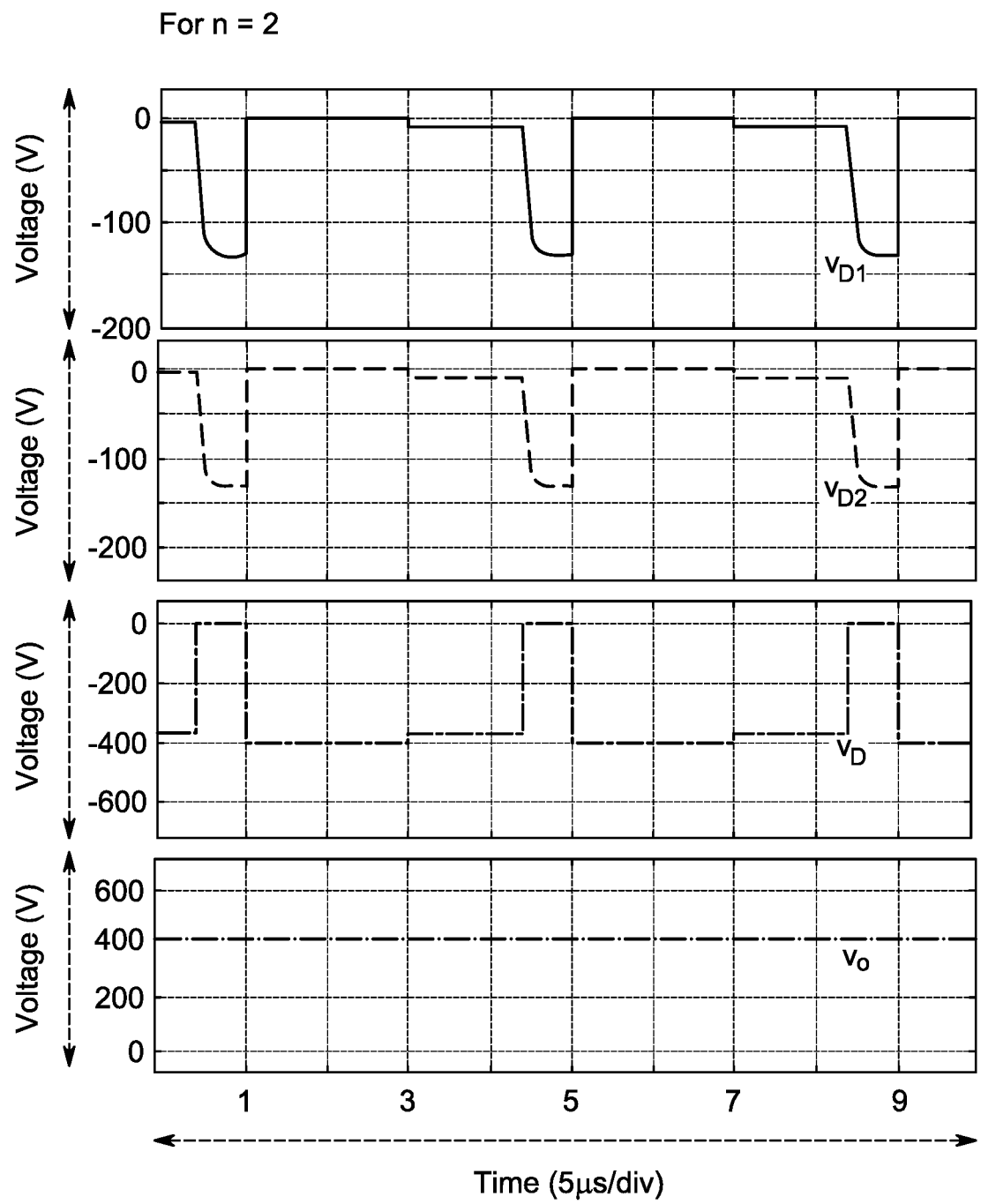

FIG. 13D exemplary illustrates observed waveforms of voltages across the leg diodes $D_1$, $D_2$ and the output diode D along with the output voltage $v_o$. It was observed that the average voltage $V_{D1}$ across the leg diode $D_1$, the average voltage $V_{D2}$ across the leg diode $D_2$ and the average voltage $V_D$ across the output diode D were −22.65V, −22.67V and −330.9V, respectively.

Figure 13E:
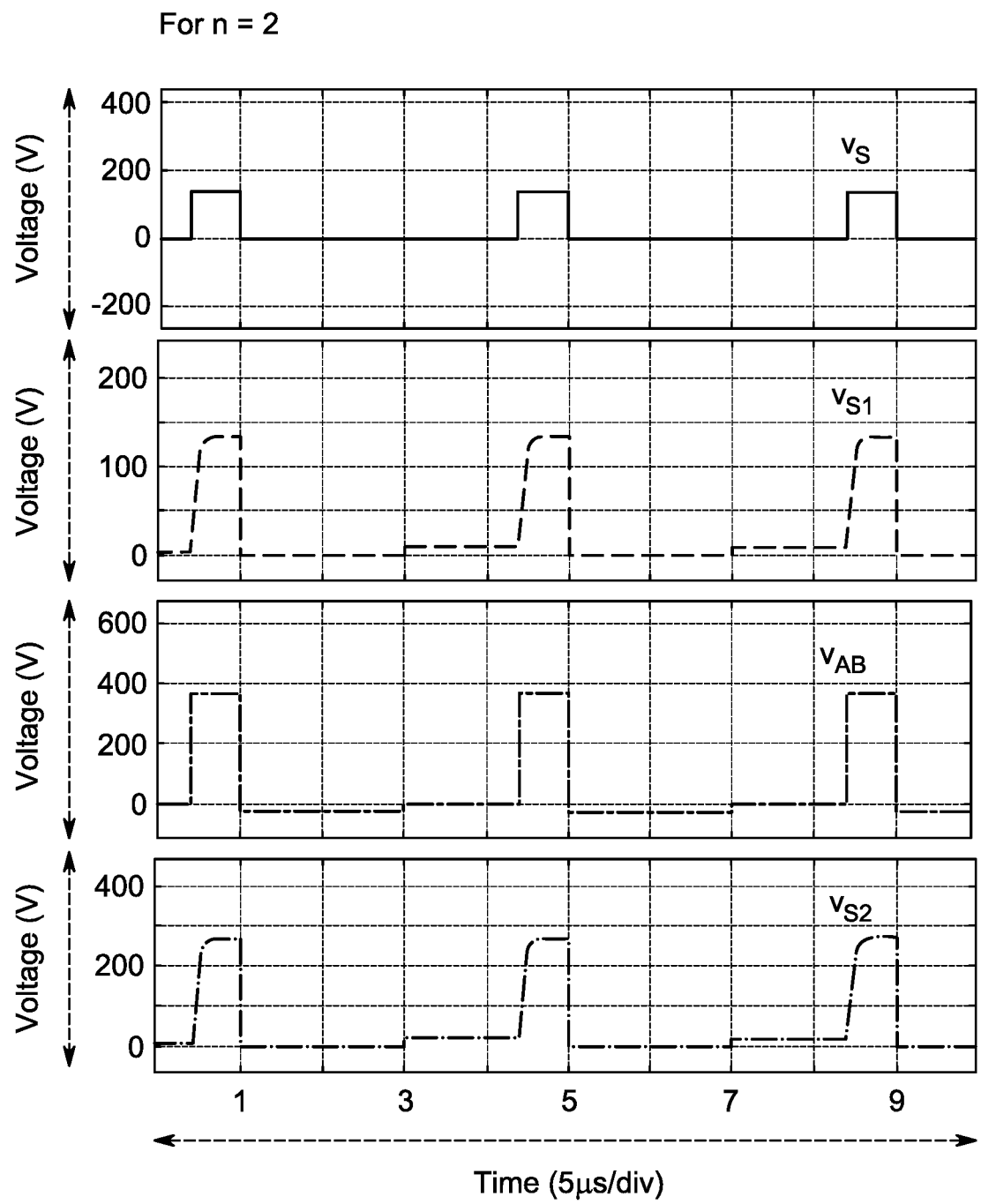

FIG. 13E illustrates observed waveforms of voltages across the active input switch S and the active leg switches $S_1$, $S_2$ and a voltage $V_{AB}$ between the terminals A and B. Average voltages $V_S$, $V_{S1}$ and $V_{S2}$ across the active input switch S, the active leg switches $S_1$, $S_2$ respectively and the voltage $V_{AB}$ were each measured 22.7V, 22.8V, 46.6V, 45.9V respectively. It is confirmed that a peak value for $V_{S2}$ at about 280V is twice larger than one for $V_{S1}$ at about 140V, which is in agreement with the prediction that the voltage stress of the switches $V_{sj}$ is proportional to j value as summarized in Table II. From the waveforms, it was also confirmed that the active input switch S and the active leg switches $S_1$, $S_2$ are conducting in state I and the active output switch $S_o$ is conducting in state II.

Figure 14:
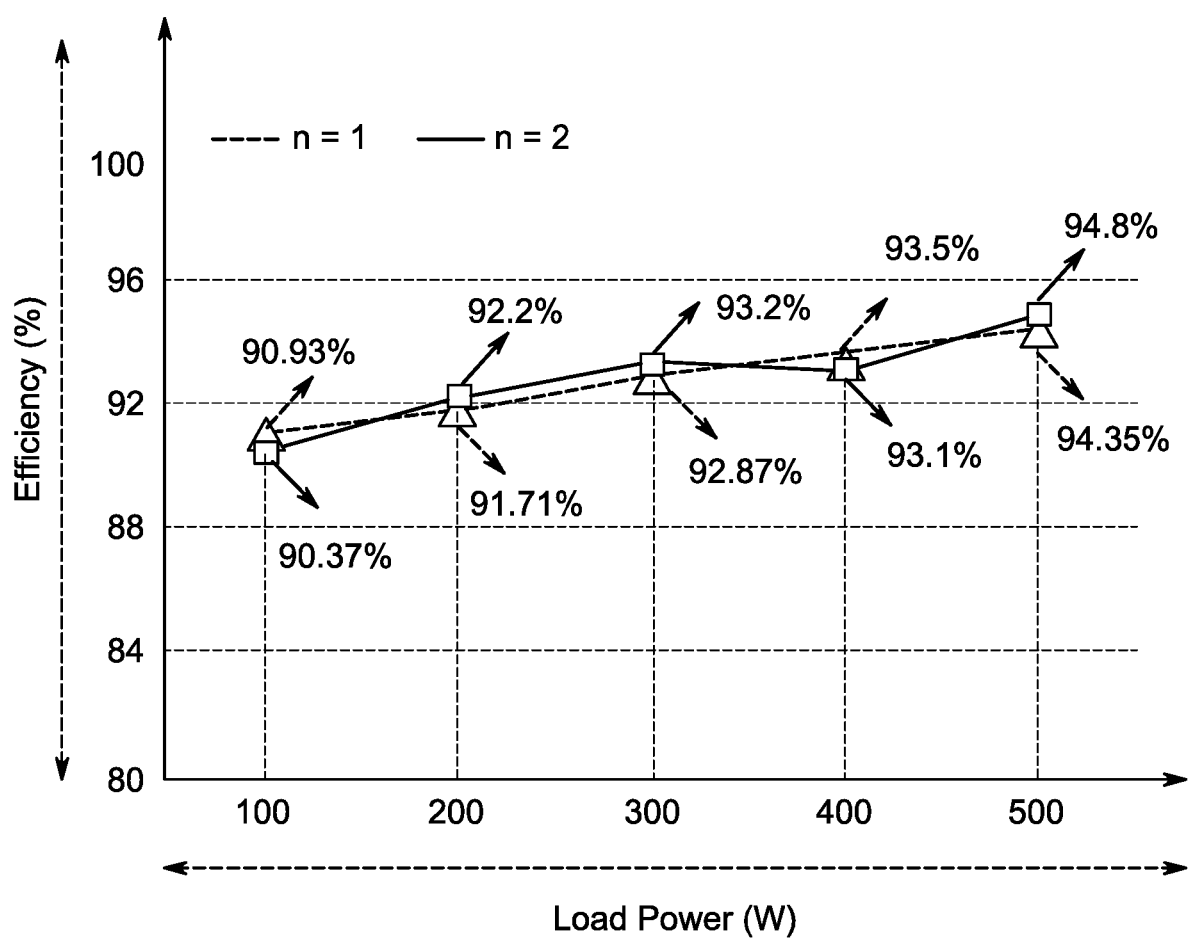
FIG. 14 is an exemplary graph for measured values of the efficiency as a function of output (load) power for PLL-HG converters with a PLL (n=1) and with two PLLs (n=2) under certain embodiments of the present disclosure and operated at $k_1$=50% and $k_2$=35%.

FIG. 14 is an exemplary graph for measured values of the efficiency as a function of output (load) power for PLL-HG converters with a leg (n=1) and one with two PLLs (n=2) under certain embodiments of the present disclosure and operated at $k_1$=50% and $k_2$=35%. As observed here, a practical level of efficiency over 94% at a high output power of 500 W has been confirmed by simulation work.

According to certain embodiments of the present disclosure, a power system with a novel DC-DC converter called Parallel Linked Leg High gain (PLL-HG) converter is presented for microgrid application. By introducing leg(s) in the middle section of classical boost converter, the PLL-HG converter is configured with small number of components for the leg(s); an active switch, an inductor, a capacitor and a diode. The main features of the PLL-HG converter include high voltage gain, flexible control with two duty cycles adjustable in a wide range of the duty cycles, low voltage/current stresses against components, and transformer-less topology. In addition, the voltage gain of the converter can be adjusted by selecting appropriate number of stages and duty cycle. Further a high voltage gain can be realized by adjusting the two duty ratios independently.

The above-described description is a non-limiting example of corresponding structure for performing the functionality described herein. Moreover, the present disclosure is not limited to the specific circuit elements described herein, nor is the present disclosure limited to the specific sizing and classification of these elements.

The functions and features described herein may also be executed by various distributed components of a system. For example, one or more processors may execute the functions of the controller, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

It will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A DC-DC voltage converter comprising:
   an input circuit;
   at least one parallel linked leg (PLL), denoted by PLLj (j=1, . . . , n, n≥1);
   an output circuit; and
   a controller,
   wherein
   the input circuit further comprising: a pair of input terminals; an input inductor, a positive contact thereof connected to a higher voltage input terminal of the pair of input terminals; and an active input switch, wherein further
   a positive port, a negative port and a gate port of the active input switch are connected to a negative contact of the input inductor, a lower voltage input terminal of the pair of input terminals and a first output port of the controller, respectively, and
   the higher voltage input terminal and the lower voltage input terminal are configured to be connected to a higher voltage terminal and a lower voltage terminal of a DC voltage source, respectively,
   the PLLj (j=1, . . . , n, n≥1), further comprising: an active leg switch $S_j$; a leg inductor $L_j$ connected with the active leg switch $S_j$ via a negative port of the active leg switch $S_j$ and a positive contact of the leg inductor $L_j$ and a leg capacitor $C_j$; and a leg diode $D_j$ connected with the leg capacitor $C_j$, via a negative contact of the leg capacitor and a positive port of the leg diode $D_j$, wherein further
   a combination of the leg capacitor $C_j$ and the leg diode $D_j$ connected in parallel with the leg inductor $L_j$, wherein the positive contact of the leg capacitor is connected to the positive contact of the leg inductor $L_j$,
   a positive port and a gate port of the active leg switch $S_j$ are connected to the higher voltage input terminal and the first output port of the controller, respectively, and
   the negative contact of the leg inductor $L_j$ constituting the $PLL_j$ is connected to
   i) the lower voltage input port when j=1, or
   ii) a negative contact of a leg capacitor $C_{j-1}$ constituting a $PLL_{j-1}$ when j≥2, and
   the output circuit further comprising: an active output switch; an output diode; an output capacitor connected in series with the output diode; and a pair of output terminals, wherein a positive port and a negative port of the output diode are connected to the negative contact of the input inductor and a positive contact of the output capacitor, respectively, a negative contact of the output capacitor is connected to a negative contact of a leg capacitor $C_n$ constituting a $PLL_n$, a positive port, a negative port, and a gate port of the active output switch are connected to the positive port of the output diode, a positive contact of the leg capacitor $C_n$ constituting the $PLL_n$, and a second output port of the controller, respectively, and a higher voltage output terminal and a lower voltage output terminal of the pair of the output terminals are connected to the positive contact and the negative contact of the output capacitor, respectively, and configured to be connected to a higher voltage input port and a lower voltage input port of an external load, respectively, and wherein the controller further comprising: a circuitry; a programmed instruction; and the first output port and the second output port, wherein the first output port is connected to the gate port of the active input switch and the gate port of the active leg switch $S_j$, while the second output port is connected to the gate port of the active output switch, wherein further the controller is configured to turn on the active input switch and the active leg switch $S_j$ and maintain turn on states thereof while maintaining the active output switch at a turn off state for a first duty cycle period $k_1T$, wherein $k_1$ and T denote a duty ratio of the first duty cycle, and a period for a complete switching cycle, respectively;

turn off the active input switch and the active leg switch $S_j$, maintain turn off states thereof, and turn on the active output switch and maintain a turn on state thereof for a second duty cycle period $k_2T$ following the first duty cycle, wherein $k_2$ denotes a duty ratio for the second duty cycle and satisfies a relation $(k_1+k_2)<1$; and turn off the active output switch and maintain the turn off state thereof while maintaining also turn off states of the active input switch and the active leg switch $S_j$ for a remaining period following the second duty cycle.

2. The DC-DC voltage converter of claim 1, further comprising an output switch diode inserted between the positive port of the output diode and the positive port of the active output switch, wherein a positive port and a negative port of the output switch diode are connected to the positive port of the output diode and the positive port of the active output switch, respectively.

3. The DC-DC voltage converter of claim 1, wherein a protective diode is connected in parallel with at least one of the active input switch, the active leg switch $S_j$, or the active output switch.

4. The DC-DC voltage converter of claim 1, wherein the controller is further configured to operate the DC-DC converter in a continuous conduction mode (CCM) by adjusting at least a) the duty ratio $k_i$ for the active input switch and the active leg switch $S_j$, b) the duty ratio $k_2$ for the active output switch, or c) a switching frequency f=1/T, and by satisfying following equations:

$$\frac{[(n+1)k_1 + nk_2](1-k_1-k_2)^2}{2((n+1)-k_2)(n+1)} < \frac{L}{RT},$$

wherein, L denotes an inductance of the input inductor and the leg inductor, R denotes a resistance of load connected to the pair of output terminals.

5. The DC-DC voltage converter of claim 1, wherein the controller is further configured to operate the DC-DC converter in a discontinuous conduction mode (DCM) by adjusting at least a) the duty ratio $k_1$ for the active input switch and the active leg switch $S_j$, b) the duty ratio $k_2$ for the active output switch, or c) a switching frequency f and by satisfying following equations:

$$\frac{[(n+1)k_1 + nk_2](1-k_1-k_2)^2}{2((n+1)-k_2)(n+1)} > \frac{L}{RT},$$

$$1-k_1-k_2 > \frac{V_i((n+1)k_1 + nk_2)}{V_o - (n+1)V_i}$$

wherein, L denotes an inductance of the input inductor and the leg inductor, R denotes a resistance of load connected to the pair of output terminals, $V_i$ and $V_o$ denote an input voltage and an output voltage, respectively.

6. The DC-DC voltage converter of claim 4, wherein the controller is further configured to switch operation modes of the DC-DC converter between a continuous conduction mode (CCM) and a discontinuous conduction mode (DCM) by adjusting at least a) the duty ratio $k_1$ for the active input switch and the active leg switch $S_j$, b) the duty ratio $k_2$ for the active output switch, or c) a switching frequency f, and by satisfying following equations:

a) for operating in the CCM mode;

$$\frac{[(n+1)k_1 + nk_2](1-k_1-k_2)^2}{2((n+1)-k_2)(n+1)} < \frac{L}{RT},$$

b) for operating in the DCM mode;

$$\frac{[(n+1)k_1 + nk_2](1-k_1-k_2)^2}{2((n+1)-k_2)(n+1)} > \frac{L}{RT},$$

$$\text{and } 1-k_1-k_2 > \frac{V_i((n+1)k_1 + nk_2)}{V_o - (n+1)V_i}$$

wherein $V_i$ is the input voltage and $V_o$ is the output voltage.

7. The DC-DC voltage converter of claim 1, wherein the controller further comprises an input port monitoring an input voltage and an output voltage, the controller is further configured to:

store a specified target range of the output voltage;
monitor the input voltage and the output voltage; and
maintain the output voltage within the specified target range by adjusting at least one of a) the duty ratio $k_1$, b) the duty ratio $k_2$, or c) the switching frequency f.

8. The DC-DC voltage converter of claim 1, the controller is further configured to:

estimate efficiencies η of the DC-DC converter for a plurality of candidate sets of the duty ratios $k_1$ and $k_2$ and a switching frequency f, in accordance with a model equation given below, $$\eta \cong \frac{1}{\frac{1+nk_1}{(n+1)-k_2-\gamma_{vd}} + \frac{V_i\left(\sum_{i=1}^{n} I_{Ci}\right)k_1}{\frac{V_o^2}{R}} + \frac{P_{S,total}^{Loss}}{\frac{V_o^2}{R}}},$$

wherein $V_i$ and $V_o$ denote an input voltage and an output voltage, respectively, $\gamma_{vd}$ represents a non-ideality factor for all of the diodes and switches, the term ($\Sigma_{i=1}{}^n I_{Ci}$) represents a total sum of charging current of the leg capacitors during the first duty cycle, $P_{S,total}{}^{Loss}$ represents a total switching power loss at the switches, R denotes a resistance of load connected to the pair of output terminals, respectively;
  select a plurality of candidate sets satisfying a requirement on a voltage gain of the DC-DC converter; and
  implement a set of the duty ratios $k_1$ and $k_2$ and the switching frequency f giving a maximum value in the efficiency among the plurality of candidate sets.

9. The DC-DC voltage converter of claim 1, wherein the controller is further configured to satisfy a sum ($k_1+k_2$) not greater than 0.8.

10. The DC-DC voltage converter of claim 1, comprising at least two parallel linked legs wherein PLLj (j=1, ..., n, n≥2).

11. A method of controlling a DC-DC converter, the DC-DC converter comprising: an input circuit; at least one parallel linked leg (PLL), denoted by PLLj (j=1, ..., n, n≥1); an output circuit; and a controller, wherein
  the input circuit further comprising: a pair of input terminals; an input inductor, a positive contact thereof connected to a higher voltage input terminal of the pair of input terminals; and an active input switch, wherein further
    a positive port, a negative port and a gate port of the active input switch are connected to a negative contact of the input inductor, a lower voltage input terminal of the pair of input terminals and a first output port of the controller, respectively, and
    the higher voltage input terminal and the lower voltage input terminal are configured to be connected to a higher voltage terminal and a lower voltage terminal of a DC voltage source, respectively,
wherein
  the PLLj (j=1, ..., n, n≥1), further comprising: an active leg switch $S_j$; a leg inductor $L_j$ connected in series with the active leg switch $S_j$ via a negative port of the active leg switch $S_j$ and a positive contact of the leg inductor $L_j$ and a leg capacitor $C_j$; and a leg diode $D_j$ connected in series with the leg capacitor $C_j$ via a negative contact of the leg capacitor and a positive port of the leg diode $D_j$, wherein further
    a combination of the leg capacitor $C_j$ and the leg diode $D_j$ connected in series is connected in parallel with the leg inductor $L_j$, wherein the positive contact of the leg capacitor is connected to the positive contact of the leg inductor,
    a positive port and a gate port of the active leg switch $S_j$ are connected to the higher voltage input terminal and the first output port of the controller, respectively, and
    the negative contact of the leg inductor $L_j$ constituting the $PLL_j$ is connected to
      iii) the lower voltage input port when J=1, or
      iv) a negative contact of a leg capacitor $C_{j-1}$ constituting a $PLL_{j-i}$ when j≥2,
wherein
  the output circuit further comprising: an active output switch; an output diode; an output capacitor connected in series with the output diode; and a pair of output terminals, wherein
    a positive port and a negative port of the output diode are connected to the negative contact of the input inductor, and a positive contact of the output capacitor, respectively,
    a negative contact of the output capacitor is connected to a negative contact of a leg capacitor $C_n$ constituting a $PLL_n$, respectively,
    a positive port of the active output switch is connected to either one of
      a) the positive port of the output diode, or
      b) a negative port of an output switch diode, wherein a positive port of the output switch diode is connected to the positive port of the output diode,
    a negative port and a gate port of the active output switch are connected to a positive contact of the leg capacitor $C_n$ constituting the $PLL_n$ and a second output port of the controller, respectively, and
    a higher voltage output terminal and a lower voltage output terminal of the pair of the output terminals are connected to a positive contact and a negative contact of the output capacitor, respectively, and configured to be connected to a higher voltage input port and a lower voltage input port of an external load, respectively, and
wherein further
  the controller further comprising: a circuitry; a programmed instruction; and the first output port and the second output port of control signals, wherein
    the first output port is connected to the gate port of the active input switch and the gate port of the active leg switch $S_j$, while the second output port is connected to the gate port of the active output switch,
wherein, the method comprising:
  turning on the active input switch and the active leg switch $S_j$ and maintaining turn on states thereof while maintaining the active output switch at a turn off state for a first duty cycle period $k_1T$, wherein $k_1$ and T (where T=1/f) denote a first duty ratio, and a period for a complete switching cycle, respectively, f denotes a switching frequency;
  turning off the active input switch and the active leg switch $S_j$ and maintaining turn off states thereof, and turning on the active output switch and maintain a turn on state thereof for a second duty cycle period $k_2T$ following the first duty cycle, wherein $k_2$ denotes a second duty ratio and satisfies a relation ($k_1+k_2$)<1; and
  turning off the active output switch and maintaining the turn off state thereof while maintaining also turn off states of the active input switch and the active leg switch $S_j$ for time span $(1-k_1-k_2)T$ following the second duty cycle.

12. The method of controlling the DC-DC converter of claim 11, further comprising:
  adjusting at least one of a) the duty ratio $k_1$, b) the duty ratio $k_2$, or c) the switching frequency f, and
  operating the DC-DC converter in a continuous conduction mode (CCM) by satisfying a following condition:

$$\frac{[(n+1)k_1 + nk_2](1-k_1-k_2)^2}{2((n+1)-k_2)(n+1)} < \frac{L}{RT},$$

wherein, L denotes an inductance of the input inductor and the leg inductor, R denotes a resistance of the load connected to the output terminals.

13. The method of controlling the DC-DC converter of claim 11, further comprising
adjusting at least one of a) the duty ratio $k_1$, b) the duty ratio $k_2$, or c) the switching frequency f, and
operating the DC-DC converter in a discontinuous conduction mode (DCM) by satisfying following condition:

$$\frac{[(n+1)k_1 + nk_2](1-k_1-k_2)^2}{2((n+1)-k_2)(n+1)} \geq \frac{L}{RT},$$

$$\text{and } 1-k_1-k_2 > \frac{V_i((n+1)k_1 + nk_2)}{V_o - (n+1)V_i},$$

wherein, L denotes an inductance of the input inductor and the leg inductor, R denotes a resistance of the load connected to the output terminals, $V_1$ and $V_o$ denotes an input voltage and an output voltage, respectively.

14. The method of controlling the DC-DC converter of claim 11, the method further comprising switching operation modes of the DC-DC converter between the continuous conduction mode (CCM) and a discontinuous conduction mode (DCM) by choosing a condition to be satisfied between below conditions a) and b):

a) for operating in the CCM mode;

$$\frac{[(n+1)k_1 + nk_2](1-k_1-k_2)^2}{2((n+1)-k_2)(n+1)} < \frac{L}{RT},$$

b) for operating in the DCM mode;

$$\frac{[(n+1)k_1 + nk_2](1-k_1-k_2)^2}{2((n+1)-k_2)(n+1)} > \frac{L}{RT},$$

$$\text{and } 1-k_1-k_2 > \frac{V_i((n+1)k_1 + nk_2)}{V_o - (n+1)V_i},$$

wherein $V_i$ is the input voltage and $V_o$ is the output voltage.

15. The method of controlling the DC-DC converter of claim 11, wherein the controller further comprising an input port configured to monitor an input voltage and an output voltage, and the method further comprising:
storing a specified range of the output voltage;
monitoring the input voltage and the output voltage;
adjusting at least one of a) the duty ratio $k_1$, b) the duty ratio $k_2$, or c) a switching frequency f, and
maintaining the output voltage within the specified range.

16. The method of controlling the DC-DC converter of claim 11, further comprising
estimating efficiencies η of the DC-DC converter for a plurality of candidate sets of the duty ratios $k_1$ and $k_2$ and a switching frequency f, in accordance with a model equation given below, $$\eta \cong \frac{1}{\frac{1+nk_1}{(n+1)-k_2-\gamma_{vd}} + \frac{V_i\left(\sum_{i=1}^{n} I_{Ci}\right)k_1}{\frac{V_o^2}{R}} + \frac{P_{S,total}^{Loss}}{\frac{V_o^2}{R}}},$$

wherein $V_i$ and $V_o$ denote an input voltage and an output voltage, respectively, $\gamma_{vd}$ represents a non-ideality factor for the diodes and switches, the term $(\Sigma_{i=1}^{n} I_{Ci})$ represents a total sum of charging current of the leg capacitors during the first duty cycle, $P_{S,total}^{Loss}$ represents a total switching power loss at the switches, R denotes a resistance of load connected to the pair of output terminals, respectively;
selecting a plurality of candidate sets satisfying a requirement on a voltage gain of the DC-DC converter; and
choosing a set of the duty ratios $k_1$ and $k_2$ and the switching frequency f giving a maximum value in the efficiency among the plurality of candidate sets.

17. The method of controlling the DC-DC converter of claim 11, wherein further the DC-DC converter comprising a plurality number Ti of the PLL with n not less than three, and the first duty cycle $k_1$ and the second duty cycle $k_2$ are configured to satisfy a condition ($k_1+k_2$) is not greater than 0.8.

18. The method of controlling the DC-DC converter of claim 11, wherein the the DC-DC converter comprises at least two parallel linked legs wherein PLLj (j=1, . . . , n, n≥2).

19. A microgrid power supply system comprising: a DC power source and a DC-DC converter, wherein the DC-DC converter further comprising;
an input circuit;
at least one parallel linked leg (PLL), denoted by PLLj (j=1, . . . , n, n≥1);
an output circuit; and
a controller,
wherein
the input circuit further comprising: a pair of input terminals; an input inductor, a positive contact thereof connected to a higher voltage input terminal of the pair of input terminals; and an active input switch, wherein further
a positive port, a negative port and a gate port of the active input switch are connected to a negative contact of the input inductor, a lower voltage input terminal of the pair of input terminals and a first output port of the controller, respectively, and
the higher voltage input terminal and the lower voltage input terminal are configured to be connected to a higher voltage terminal and a lower voltage terminal of a DC voltage source, respectively,
wherein
the PLLj (j=1, . . . , n, n≥1), further comprising: an active leg switch $S_j$; a leg inductor $L_j$ connected in series with the active leg switch $S_j$ via a negative port of the active leg switch $S_j$ and a positive contact of the leg inductor $L_j$ and a leg capacitor $C_j$; and a leg diode $D_j$ connected in series with the leg capacitor $C_j$ via a negative contact of the leg capacitor and a positive port of the leg diode $D_j$, wherein further
a combination of the leg capacitor $C_j$ and the leg diode $D_j$ connected in series is connected in parallel with the leg inductor $L_j$, wherein the positive contact of the leg capacitor is connected to the positive contact of the leg inductor, a positive port and a gate port of the active leg switch $S_j$ are connected to the higher voltage input terminal and the first output port of the controller, respectively, and the negative contact of the leg inductor $L_j$ constituting the $PLL_1$ is connected to i) the lower voltage input port when j=1, or ii) a negative contact of a leg capacitor $C_{j-1}$ constituting a $PLL_{j-1}$ when j≥2, wherein, an output circuit further comprising: an active output switch; an output diode; an output capacitor connected in series with the output diode; a pair of output terminals, wherein a positive port and a negative port of the output diode are connected to the negative contact of the input inductor and a positive contact of the output capacitor, respectively, a negative contact of the output capacitor is connected to a negative contact of a leg capacitor $C_n$ constituting a $PLL_n$, a positive port of the active output switch is connected to either one of a) the positive port of the output diode, or b) a negative port of an output switch diode, wherein a positive port of the output switch diode is connected to the positive port of the output diode, a negative port and a gate port of the active output switch are connected to a positive contact of the leg capacitor $C_n$ constituting the $PLL_n$ and a second output port of the controller, respectively, and a higher voltage output terminal and a lower voltage output terminal of the pair of the output terminals are connected to a positive contact and a negative contact of the output capacitor, respectively, and configured to be connected to a higher voltage input port and a lower voltage input port of an external load, respectively, and wherein the controller further comprising: a circuitry; a programmed instruction; and the first output port and the second output port of control signals, wherein the first output port is connected to the gate port of the active input switch and the gate port of the active leg switch $S_j$, while the second output port is connected to the gate port of the active output switch, and wherein further the controller is configured to turn on the active input switch and the active leg switch $S_j$ and maintain turn on states thereof while maintaining the active output switch at a turn off state for the first duty cycle period $k_1T$, wherein $k_1$ and T denotes a first duty ratio, and a period for a complete switching cycle, respectively;

turn off the active input switch and the active leg switch $S_j$, maintain turn off states thereof, and turn on the active output switch and maintain a state thereof for a second duty cycle period $k_2T$ following the first duty cycle period, wherein $k_2$ denotes a second duty ratio and satisfies a relation $(k_1+k_2)<1$; and turn off the active output switch and maintain the turn off state thereof while maintaining also turn off states of the active input switch and the active leg switch $S_j$ for a remaining period following the second duty cycle period.

* * * * *